United States Patent
Noumi et al.

(10) Patent No.: US 8,265,087 B2
(45) Date of Patent: Sep. 11, 2012

(54) GATEWAY APPARATUS AND DATA TRANSFER CONTROL METHOD

(75) Inventors: Kaoru Noumi, Kobe (JP); Susumu Nishihashi, Kobe (JP); Tomoyuki Katou, Kobe (JP); Yukio Ishikawa, Kobe (JP); Yasuyuki Umezaki, Kawasaki (JP); Hidetaka Ebeshu, Kawasaki (JP); Shigeo Koide, Kawasaki (JP); Yukio Fujisawa, Tokyo (JP); Hiroaki Shimauchi, Tokyo (JP)

(73) Assignees: Fujitsu Ten Limited, Kobe (JP); Fujitsu Semiconductor Limited, Yokohama (JP); Renesas Electronics Corporation, Kanagawa (JP)

( * ) Notice: Subject to any disclaimer, the term of this patent is extended or adjusted under 35 U.S.C. 154(b) by 557 days.

(21) Appl. No.: 11/976,687

(22) Filed: Oct. 26, 2007

(65) Prior Publication Data

US 2008/0101394 A1    May 1, 2008

(30) Foreign Application Priority Data

Oct. 27, 2006  (JP) ................................ 2006-293372

(51) Int. Cl.
    *H04L 12/28* (2006.01)
(52) U.S. Cl. .......................... 370/401; 370/392; 370/351
(58) Field of Classification Search .................. 370/401, 370/389, 390
    See application file for complete search history.

(56) References Cited

U.S. PATENT DOCUMENTS

| | | | | |
|---|---|---|---|---|
| 5,640,433 A | * | 6/1997 | Szczebak et al. | ............. 375/377 |
| 5,670,732 A | * | 9/1997 | Utsumi et al. | ................... 84/645 |
| 5,691,985 A | | 11/1997 | Lorenz et al. | |
| 6,411,810 B1 | * | 6/2002 | Maxemchuk | ................ 455/453 |
| 6,690,648 B2 | * | 2/2004 | Niida et al. | .................... 370/236 |
| 2002/0041594 A1 | * | 4/2002 | Suzuki et al. | ................. 370/390 |
| 2004/0151175 A1 | * | 8/2004 | Moll et al. | ..................... 370/389 |
| 2005/0004735 A1 | | 1/2005 | Kelly et al. | |
| 2005/0251604 A1 | | 11/2005 | Gerig | |
| 2005/0254518 A1 | | 11/2005 | Fujimori | |
| 2006/0271694 A1 | | 11/2006 | Matsuo et al. | |
| 2007/0133578 A1 | | 6/2007 | Tani | |
| 2008/0222479 A1 | * | 9/2008 | Banerjee et al. | .............. 714/749 |

FOREIGN PATENT DOCUMENTS

| | | | |
|---|---|---|---|
| EP | 1465370 | * | 6/2004 |
| EP | 1 465 370 A1 | | 10/2004 |
| GB | 2 398 700 A | | 8/2004 |

(Continued)

OTHER PUBLICATIONS

Jun. 7, 2011 Notice of Rejection issued in copending Japanese Appln. No. 2006-293372 with English translation.

*Primary Examiner* — Dang Ton
*Assistant Examiner* — Pamit Kaur
(74) *Attorney, Agent, or Firm* — Oliff & Berridge, PLC

(57) ABSTRACT

A gateway apparatus for performing transfer control of frame data between communication channels includes a routing map that stores ID information about the frame data and information about a communication channel that uses the ID information, and a search engine unit that routes the frame data to a transfer destination on the basis of the ID information of the frame data received and the routing map. The search engine unit does not transfer the frame data to the transfer destination when the ID information about the frame data received is ID information that is not used in the communication channel through which the frame data is received.

8 Claims, 37 Drawing Sheets

FOREIGN PATENT DOCUMENTS

| | | |
|---|---|---|
| JP | A-2001-320396 | 11/2001 |
| JP | A-2003-244187 | 8/2003 |
| JP | A-2003-264571 | 9/2003 |
| JP | A-2004-104705 | 4/2004 |
| JP | A-2004-192278 | 7/2004 |
| JP | A-2005-277896 | 10/2005 |
| JP | A-2006-159769 | 6/2006 |
| JP | A-2006-319540 | 11/2006 |
| JP | A-2006-333438 | 12/2006 |
| JP | A-2006-352235 | 12/2006 |
| JP | A-2007-166302 | 6/2007 |
| JP | A-2007-196971 | 8/2007 |
| WO | WO 2006/062228 A1 | 6/2006 |

\* cited by examiner

FIG. 12
(A)
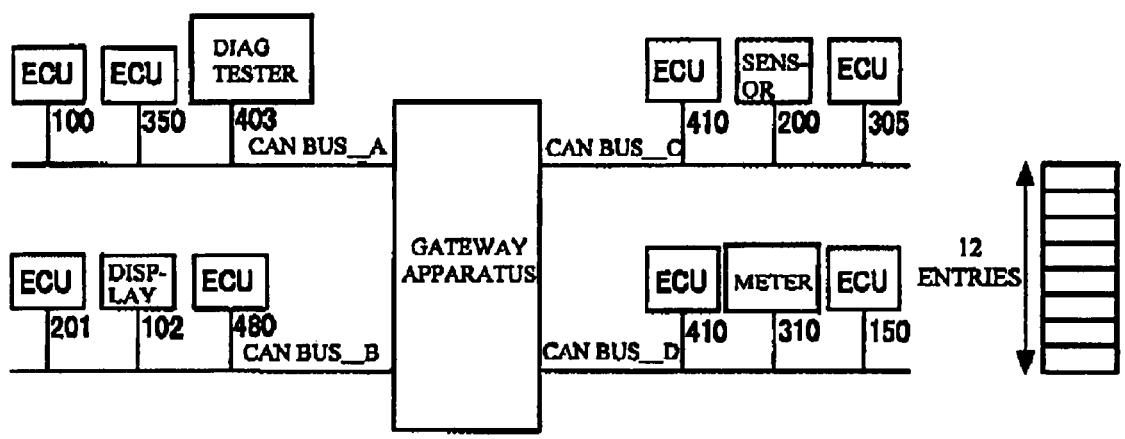
(B)
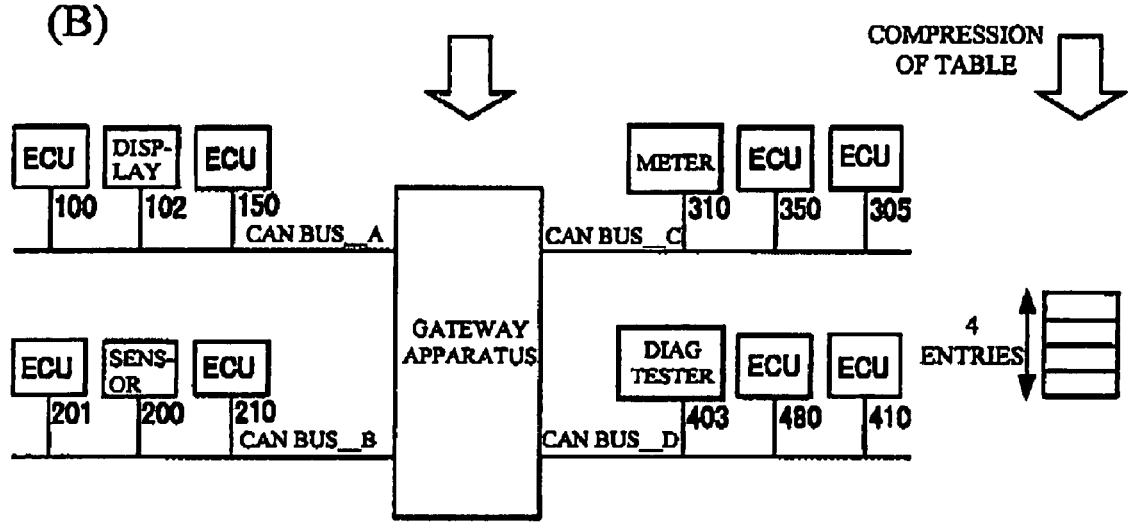

FIG. 18A
SELECTOR UNIT INPUT DATA

| IDE | RTR | CAN ID | DATA | DLC |
|---|---|---|---|---|
| 1BIT | 1BIT | 29BIT | 64BIT | 4BIT |

FIG. 18B
SELECTOR UNIT OUTPUT (DATA WITH TIME STAMP)

| RXCH | IDE | RTR | CAN ID | DATA | DLC | TS |
|---|---|---|---|---|---|---|
| 6BIT | 1BIT | 1BIT | 29BIT | 64BIT | 4BIT | * |

DATA USED IN SEARCH ENGINE UNIT (RXCH, IDE, RTR, CAN ID)

* : MULTIPLE BITS

FIG. 18C
INFORMATION WRITTEN IN SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

* : MULTIPLE BITS

FIG. 18D
DATA READ BY CPU FROM SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

* : MULTIPLE BITS

FIG. 22

| ID | RECEIVE-ALLOWED CHANNEL INFORMATION |
|---|---|
| ID A | 000001 |
| ID B | 111111 |
| ID C | 000101 |

FOR ID A, ROUTING IS ENABLED ONLY WHEN DATA IS RECEIVED THROUGH CHANNEL 0

FOR ID B, ROUTING IS ENABLED THROUGH ALL CHANNELS

FOR ID C, ROUTING IS ENABLED ONLY WHEN DATA IS RECEIVED THROUGH ONLY CHANNEL 0 OR 2

GATEWAY APPARATUS AND DATA TRANSFER CONTROL METHOD

INCORPORATION BY REFERENCE

The disclosure of Japanese Patent Application No. 2006-293372 filed on Oct. 27, 2006 including the specification, drawings and abstract is incorporated herein by reference in its entirety.

BACKGROUND OF THE INVENTION

1. Field of the Invention

The present invention relates to a gateway apparatus mounted on a vehicle and relaying data between a plurality of networks, and also to a data managing method with the gateway apparatus.

2. Description of the Related Art

Recently, as shown in FIG. 35, a plurality of ECUs are mounted on vehicles, such as an engine ECU, a door controlling ECU, an airbag ECU, an audio ECU, and a navigation ECU. In order for these in-vehicle ECUs to have communications between a plurality of LANs having different communication systems and different communication speeds, a gateway apparatus is required.

A gateway apparatus implements gateway functions such as relaying data sent and received between a plurality of different networks by software control, conversion of communication protocols, and packet filtering. Thus communications between nodes connected to different networks are performed.

Japanese Patent Application Publication Nos. JP-A-2003-244187 and JP-A-2003-264571 disclose that the routing function of the gateway apparatus is implemented by software.

SUMMARY OF THE INVENTION

According to an aspect of the present invention, there is provided a gateway apparatus in which routing of frame data is implemented by hardware.

According to another aspect of the present invention, there is provided a gateway apparatus for performing transfer control of frame data between communication channels, the gateway apparatus including: a routing map that stores ID information about the frame data and information about a communication channel that uses the ID information; and a search engine unit that routes the frame data to a transfer destination on the basis of the ID information of the frame data received and the routing map, wherein the search engine unit does not transfer the frame data to the transfer destination when the ID information about the frame data received is ID information that is not used in the communication channel through which the frame data is received.

According to yet another aspect of the present invention, there is provided a gateway apparatus for performing transfer control of frame data between communication channels, the gateway apparatus including: a search engine unit that routes frame data received to a transfer destination, wherein, when a communication channel through which the frame data is received coincides with a communication channel involved in the transfer destination of the frame data, the search engine unit does not transfer the frame data to the transfer destination.

According to a further aspect of the present invention, there is provided a method for performing transfer control of frame data between communication channels, including: acquiring ID information inserted into the frame data upon receiving the frame data; referring to the ID information and information about a communication channel that uses the ID information, and determining whether the frame data is received through a communication channel allowed to receive frame data; and routing the frame data to a transfer destination when the frame data is received through the communication channel allowed to receive frame data.

According to a still further aspect of the present invention, there is provided a method for performing transfer control of frame data between communication channels, including: comparing one of the communication channels used to receive the frame data with a communication channel through which the frame data should be transferred to a destination; and discarding the frame data when the one of the communication channels coincides with the communication channel through which the frame data should be transferred to the destination.

BRIEF DESCRIPTION OF THE DRAWINGS

FIG. 12 is another illustration diagram of the masking process:

FIGS. 18A through 18D show respective configurations of frame data processed in the gateway hardware macro section;

FIG. 22 illustrates an exemplary configuration of an ID information table;

DETAILED DESCRIPTION OF THE PREFERRED EMBODIMENTS

According to an aspect of the present invention, a gateway apparatus has been made in view of the following.

In order to allow nodes on multiple communication channels to communicate with a remote party through an allowed communication channel, the gateway apparatus appropriately copes with frame data sent through a channel that is now allowed to use.

The gateway apparatus may be required to inhibit a loop-back transfer in which frame data received through a communication channel is transferred to the same communication channel.

Multiple read registers that temporarily store routed frame data from multiple sending FIFOs are provided in association with the multiple sending FIFOs for each channel. However, the use of the multiple read registers may increase the hardware scale.

The frame data read from the read registers are subjected to rearrangement by a software control prior to transfer to a CAN. Different rearrangements are required for different CAN protocols. This burdens the software process and is an excessive overhead. Further, increased load on software reduces the time margin at the time of routing frame data.

The following embodiments have been made taking into consideration at least one of the above-described viewpoints.

Figure 1:
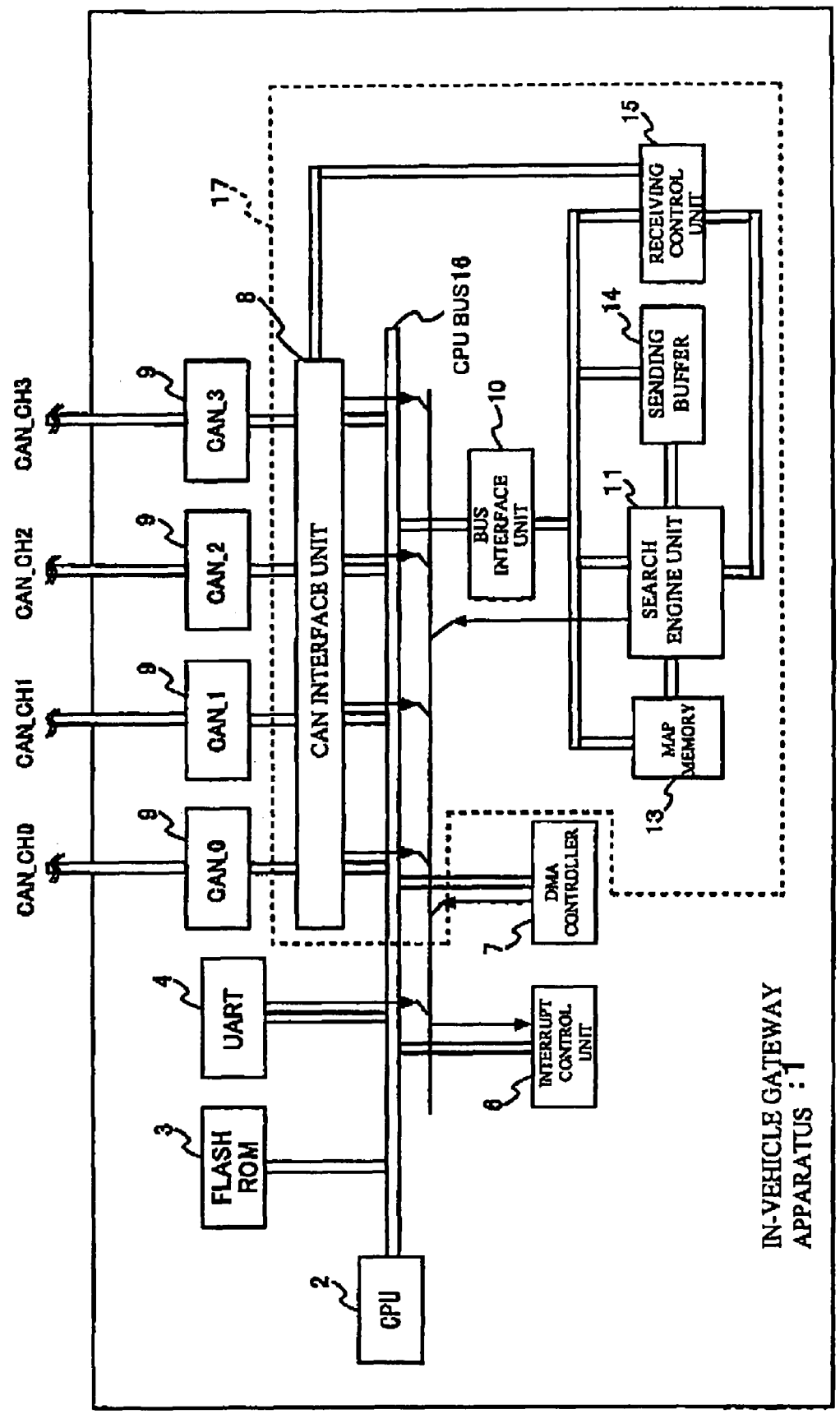
FIG. 1 is a block diagram showing a configuration of an in-vehicle gateway apparatus.

First referring to FIG. 1, the construction of the present preferred embodiment will be described. FIG. 1 shows the construction of an embodiment of a gateway apparatus of the present invention applied to an in-vehicle gateway apparatus for communication by CAN (Controller Area Network) protocols. In the in-vehicle gateway apparatus 1 shown in FIG. 1, a CPU bus 16 is connected with a CPU 2, a flash read only memory (ROM) 3, a universal asynchronous receiver transmitter (UART) 4, an interrupt control unit 6, a DMA controller 7, a CAN interface unit 8, a plurality of CANs 9 (while four CAN of CAN_0, CAN_1, CAN_2 and CAN_3 are shown in a second embodiment, the number of CANs is not limited to this), a bus interface unit 10, and the like. The bus interface unit 10 is connected with a search engine unit 11, a map memory 13, a sending buffer 14 and a receiving control unit 15. The search engine unit 11, the sending buffer 14 and the receiving control unit 15 are connected by data lines which input and output data from and to the CPU bus 16 via the bus interface unit 10. Between the search engine unit 11 and the sending buffer 14 and between the search engine unit 11 and the receiving control unit 15 are also connected by data lines. The receiving control unit 15 is connected with the CAN interface unit 8 by data lines as to input data directly from the CAN interface unit 8. In FIG. 1, other than data lines, control lines which send and receive control signals are shown. The CPU 2 outputs signals for controlling the abovementioned function sections to the control lines. The control lines are also wired between the DMA controller 7 and the search engine unit 11, and the DMA controller 7, without the control by the CPU 2, reads out data from the search engine unit 11 and transfers the data to forwarding destinations. Here, the configuration having the search engine unit 11, the map memory 13, the sending buffer 14, the receiving control unit 15, the bus interface unit 10 and the CAN interface unit 8 is called a gateway hardware macro section 17.

The gateway hardware macro section 17 is mainly provided with the following functions: first, to take out frame data from a message box of the CAN 9 by using, as a trigger, an interrupt signal generated by the CAN 9 when the frame data is received; second, to route the frame data received; and third, to detect routing errors and other errors. Besides the above, a transmit function of routed data and such may be provided.

The flash ROM 3 stores data or programs used when the CPU 2 runs various processes including a data transmission process. The CPU 2 controls the whole in-vehicle gateway apparatus 1 shown in FIG. 1 and processes the transmission of the frame data routed by the search engine unit 11 by program-control. The CPU 2 performs routing to sort forwarding destinations of the frame data received, based on the programs stored in the flash ROM 3.

The UART 4 is connected with external devices and converts parallel signals sent from the external devices to serial signals, and conversely, converts serial signals sent from serial devices to parallel signals.

The interrupt control unit 6 controls outputs of interrupt signals output from the search engine unit 11 to the CPU 2. When a predefined number of frames are stored in a sending FIFO (a first storage) 21, when the sending FIFO 21 is overflowed, and when a routing error occurred in the search engine unit 11, the search engine unit 11 outputs an interrupt signal to the CPU 2. The DMA controller 7 DMA transfers frame data stored in the sending FIFO 21 routed by the search engine unit 11 without involving the CPU 2.

A plurality of CANS 9 (i.e. CAN_0, CAN_1, CAN_2 and CAN_3) are provided for respective communication channels and store the frame data received from a CAN bus (not shown) and the frame data routed by the search engine unit 11 and by the CPU 2. The routed frame data is read out from the message box and is output to the CAN bus. The CAN 9, when receiving frame data from the communication channel, outputs an interrupt signal to the search engine unit 11.

The search engine unit 11 takes out frame data from the message box of the CAN 9, with the interrupt signal output from the CAN 9 as a trigger, and stores the data to the receiving control unit 1S via the CAN interface unit 8. Thereafter, the search engine unit 11 takes out the frame data from the receiving control unit 15 by a predefined timing clock and performs processes such as routing and searching information of relay destinations of data. The search engine unit 11 is also provided with a function to detect an error occurred in the routing process. The details of a routing map stored in the map memory 13 are described later.

The sending buffer 14 stores the frame data routed by the search engine unit 11. The receiving control unit 15 stores the frame data read out from the message box of the CAN 9.

Figure 2:
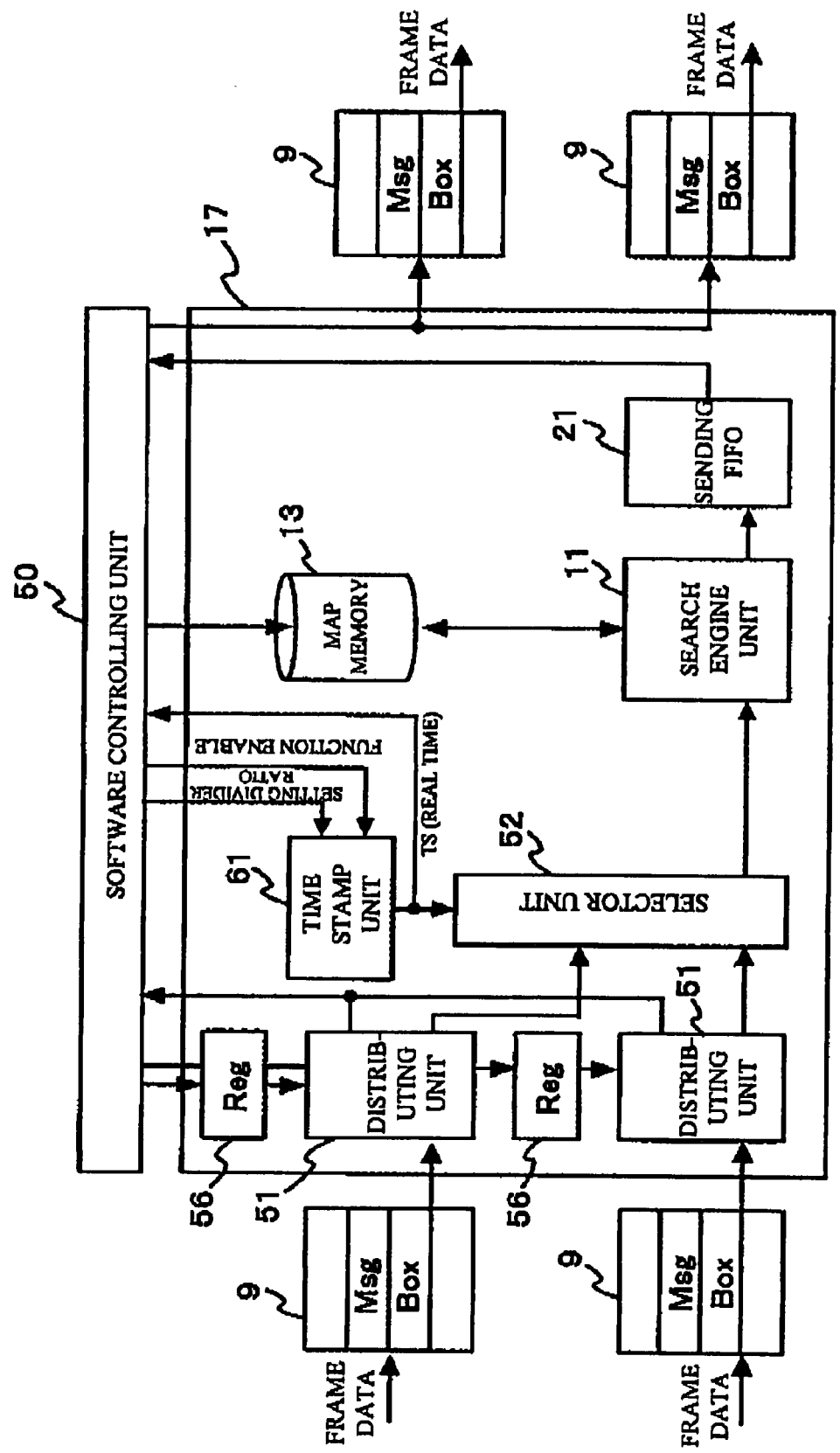
FIG. 2 is an illustration showing a configuration of a gateway hardware macro section.

Next, in reference with FIG. 2, a configuration of the gateway hardware macro section 17 is described. In the in-vehicle gateway apparatus 1 of the second embodiment, the routing of frame data is performed in parallel by a software controlling unit 50 of the CPU 2 and by the gateway hardware macro section 17 provided as hardware.

The gateway hardware macro section 17 has, as shown in FIG. 2, distributing units 51 and registers 56 provided for each communication channel, a selector unit 52, a time stamp unit 61, a search engine unit 11, a map memory 13 and a sending FIFO 21. The abovementioned parity bit summing unit 1300 and checker 1400 are provided between the search engine unit 11 and the map memory 13. Their details are described later.

As shown in FIG. 2, the distributing unit 51, which may be called routing unit, is provided for each communication channel, takes out frame data from a message box 9 of the CAN 9 and performs a sorting process of output destination of the frame data. The distributing unit 51, in reference with destination information set in the frame data, sets the forwarding destination of the frame data to any one of the software controlling unit 50, the selector unit 52 or both the software controlling unit 50 and the selector unit 52. The software controlling unit 50 is a functional section which is enabled by the program-controlled operation of the CPU 2.

Consequently, sorting output destinations of data by the unit of channels and of selected frames allows processes by the software controlling unit 50 and by the hardware in the search engine unit 11 to be preformed in parallel.

As the frame data to be sent to the software controlling unit 50 in priority is transferred without involving the search engine unit 11, the start time of the process in the software controlling unit 50 can be expedited.

The register 56 stores setting information set by the software controlling unit 50. The setting information at least contains operational setting information of an in-vehicle gateway apparatus and setting information for sorting. The distributing unit 51 sorts out frame data according to the setting information stored in the register 56. While only the distributing unit 51 operates referencing with the setting information, the selector unit 52, the search engine unit 11 and the sending FIFO 21 provided at later stages never stop operating and such by the setting information. Consequently, even if the settings of the gateway, communication channels and such are dynamically changed, the problems in that frame data being lost and such in the gateway hardware macro section 17 do not occur.

While a single piece of the search engine unit 11 is provided for a plurality of communication channels, the sending FIFO 21 is provided for each of the communication channels. In order to implement such configuration, the selector unit 52 is provided at the prior stage to the search engine unit 11. The selector unit 52 is fed with frame data from a plurality of communication channels and selects the frame data to output to the search engine unit 11. The selector unit 52 controls the timing of outputting the selected frame data to the search engine unit 11. Even when frame data is output from a plurality of communication channels simultaneously, the selector unit 52 selects the frame data by the order of priority and by the order of arrival, and controls the timing of output to the search engine unit 11. Consequently, the search engine unit 11 can be shared by a plurality of communication channels.

Figure 3:
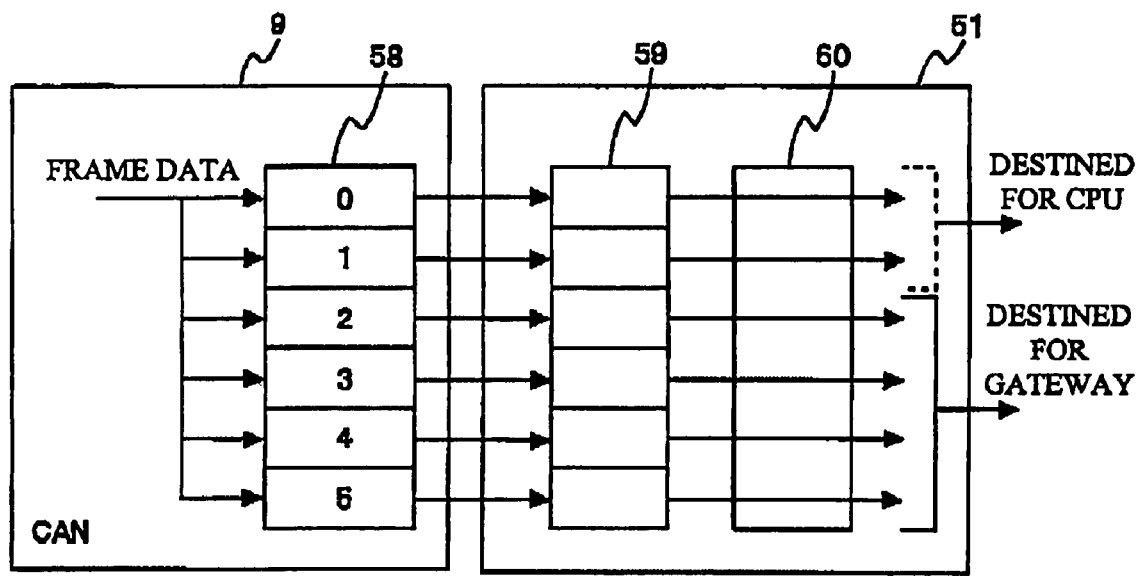
FIG. 3 is a block diagram showing a configuration of a distributing unit.

In reference with FIG. 3, the details of the distributing unit 51 are described. The distributing unit 51 has a first destination distributing unit 59 and a second destination distributing unit 60.

Frame data is sorted by a message distributing unit 58 of the CAN 9 according to an ID of the data and is registered to the message boxes (0, 1, 2, 3, and so on). The first destination distributing unit 59 sets the destination of frame data in the locations sorted by the message distributing unit 58 (i.e. the message boxes 0, 1, 2, 3, and so on) for the software controlling unit 50 or for the search engine unit 11, or sets a multi-destination transmission which sets destinations for both the software controlling unit 50 and the search engine unit 11. Some frame data is discarded here. The second destination distributing unit 60, according to the processing status of the search engine unit 11, forcibly changes the frame data which has been destined for the search engine unit 11 to the software controlling unit 50 or sets frame data to be discarded.

Figure 4:
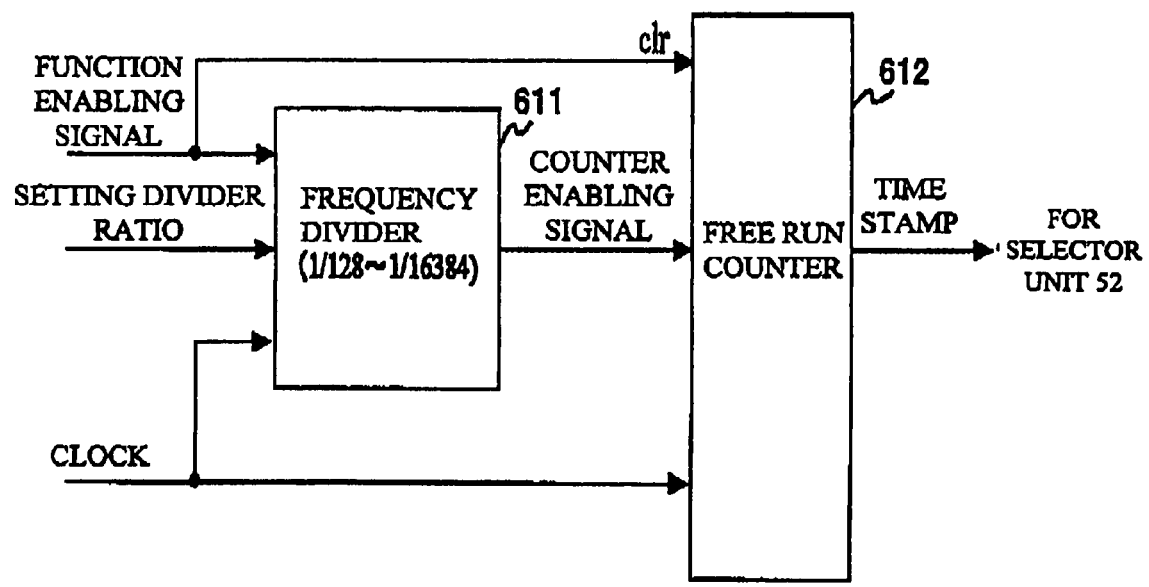
FIG. 4 is a block diagram showing a configuration of a time stamp unit.

In reference with FIG. 4, a configuration of the time stamp unit 61 is described.

The time stamp unit 61 appends time stamps to the frame data input to the selector unit 52. The time stamp unit 61, as shown in FIG. 4, is provided with a frequency divider 611 and a free running counter 612.

The frequency divider 611 is fed with a function enabling signal and a divider ratio setting signal output from the CPU 2, and a clock signal. When the function enabling signal is enabled, the frequency divider 611, outputs a counter enabling signal which is produced based on the frequency divided clock signal according to the setting of the divider ratio setting signal to the free running counter 612.

The free running counter 612 is fed with the clock signal, the counter enabling signal output from the frequency divider 611 and the function enabling signal from the CPU 2. The free running counter 612, when the function enabling signal is enabled, outputs a time stamp by counting the counter enabling signal output from the frequency divider 611.

For example, when the clock frequency is at 16 MHz and the free running counter is a 16-bit counter, with the frequency dividing setting of $1/128$, the minimum measurable time becomes 8 μs and the maximum measurable time becomes 0.524 seconds. When the frequency dividing setting is $1/16384$, the minimum measurable time becomes 1.024 ms and the maximum measurable time becomes 67.1 seconds.

Figure 5:
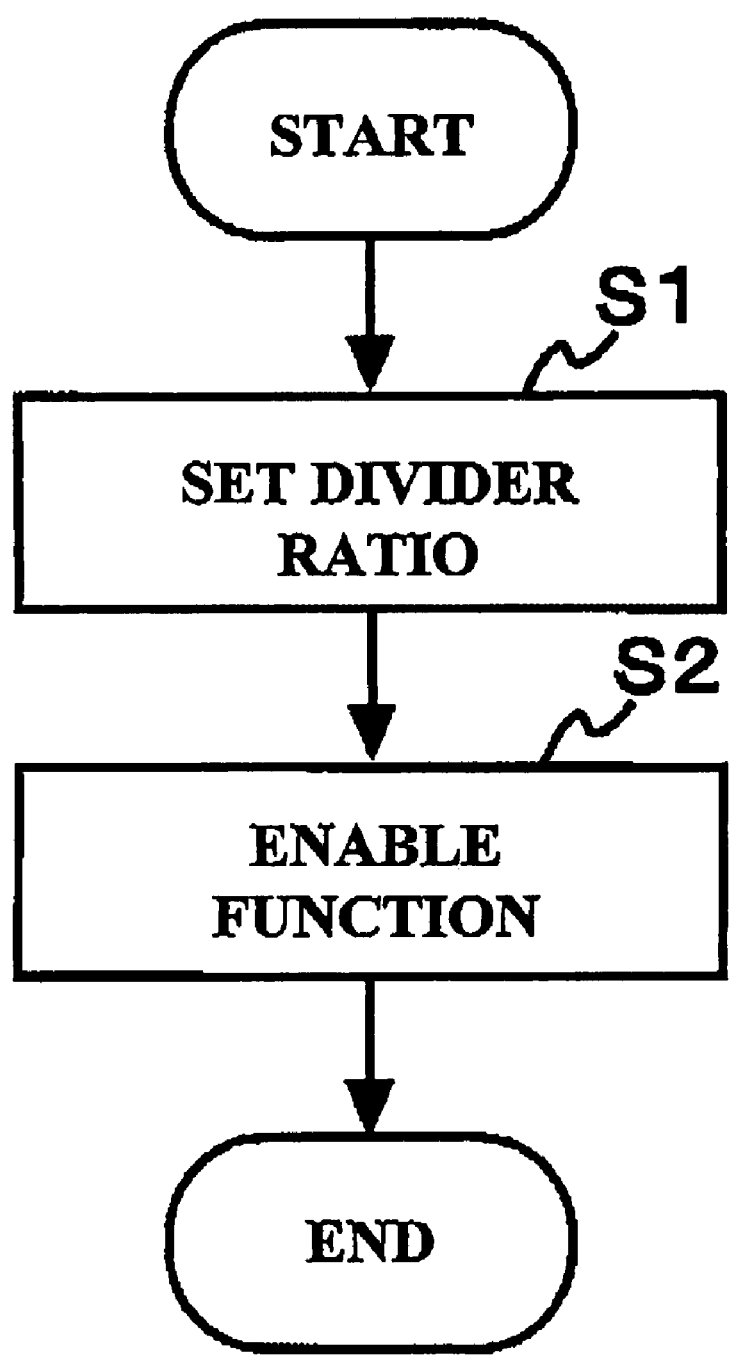
FIG. 5 is a flowchart showing a procedure of an initial setting process of the time stamp unit by a CPU.

In reference with a flowchart shown in FIG. 5, a procedure for the initial setting of the time stamp unit 61 by the CPU 2 is described.

At an initial operation, the CPU 2 sets, for the time stamp unit, the divider ratio according to the range to be measured and resolution (step S1), and thereafter, sets the function enabling signal enable and activates the time stamp unit 61 (step S2).

Figure 6:
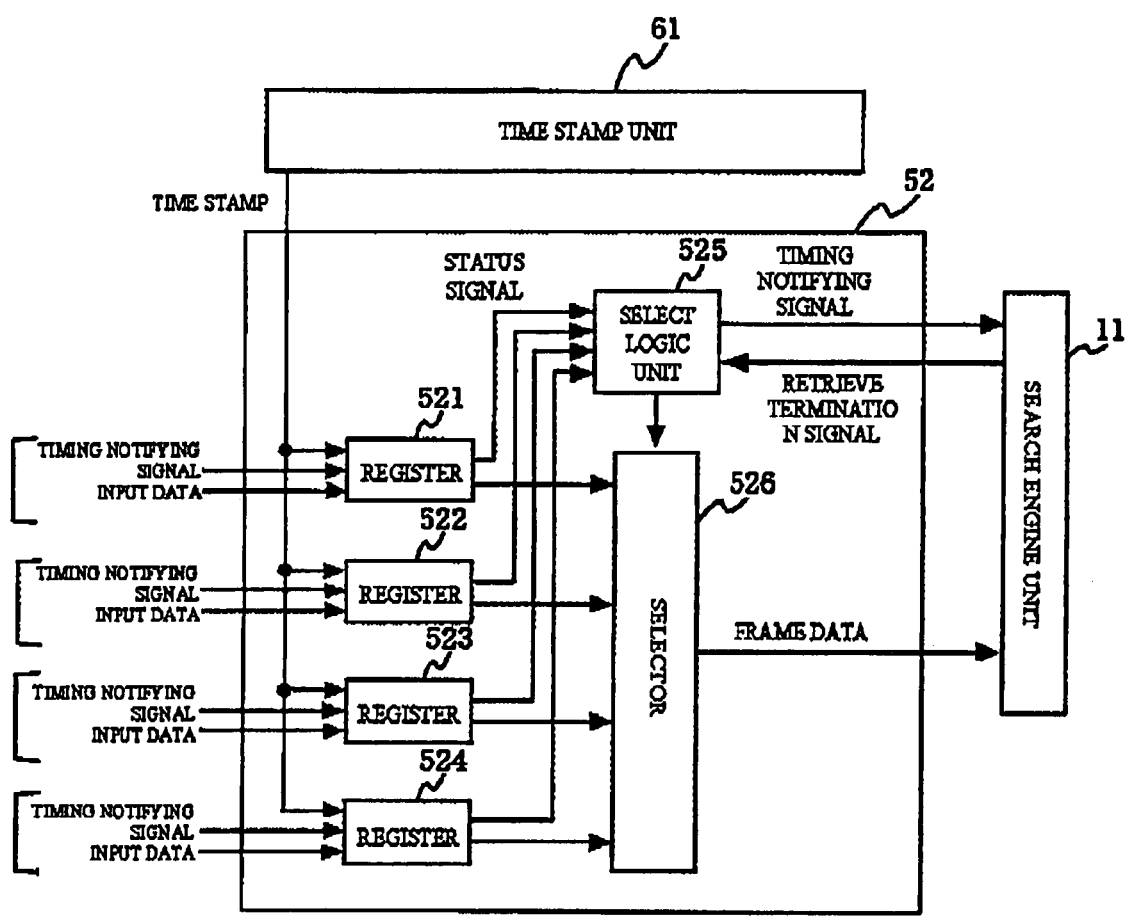
FIG. 6 is a block diagram showing a configuration of a selector.

In reference with FIG. 6, a configuration of the selector unit 52 is described. The selector unit 52 has registers 521, 522, 523 and 524 provided for each communication channel, and a select logic unit 525 and a selector 526.

The registers 521, 522, 523 and 524 are fed with frame data from each channel, timing notifying signals to notify the input timing of frame data to respective registers 521, 522, 523 and 524, and a time stamp issued by the time stamp unit 61. The time stamp issued by the time stamp unit 61 is appended to the frame data in the registers 521, 522, 523 and 524.

The registers 521, 522, 523 and 524 output, to the select logic unit 525, a status signal which indicates whether the valid frame data is held in the registers 521, 522, 523 and 524 or not. The registers 521, 522, 523 and 524 output the frame data, to which the time stamp is appended, to the selector 526 at a predefined timing. The select logic unit 525 outputs, to the selector 526, a select instruction signal that selects the frame data to be output, based on the status signals from the registers 521, 522, 523 and 524. The selector 526 selects the frame data according to the select instruction signal from the select logic unit 525, and thereafter, outputs the frame data to the search engine unit 11 in a subsequent stage.

Figure 7:
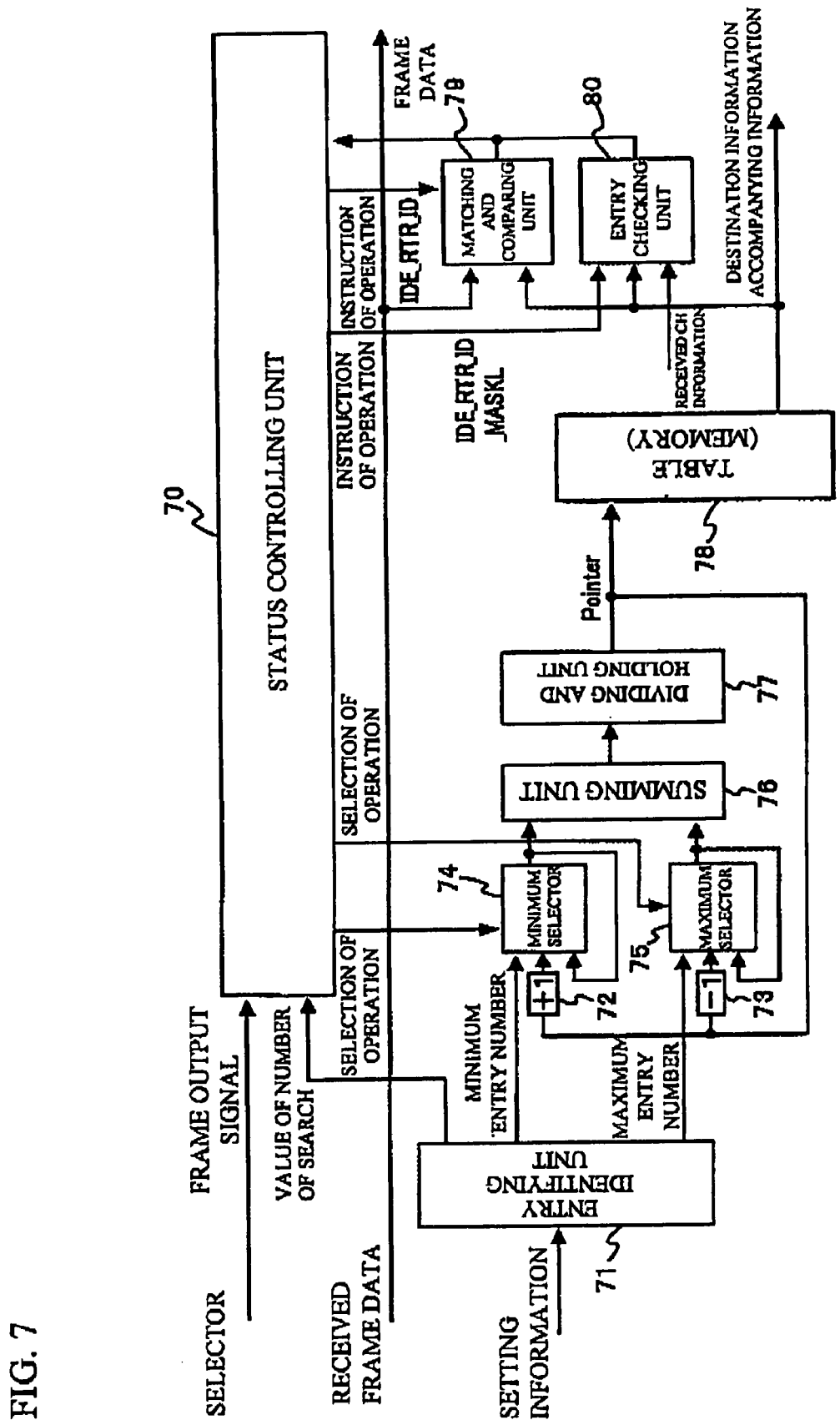
FIG. 7 is a block diagram showing a configuration of a search engine unit.

In reference with FIG. 7, the details of the configuration of the search engine unit 11 are described. The search engine unit 11 is provided with a status controlling unit 70, an entry identifying unit 71, a number summing unit 72, a number subtractor 73, a minimum selector 74, an maximum selector 75, an summing unit 76, a dividing and holding unit 77, a table 78 configured in memory, a matching and comparing unit 79 and an entry checking unit 80.

The status controlling unit 70 is fed with a frame output signal from the selector unit 52 and controls all functional sections shown in FIG. 7. The status controlling unit 70 controls to search the table 78 for the predetermined number of times according to a number of times to search which is input from the entry identifying unit 71.

Figure 8:
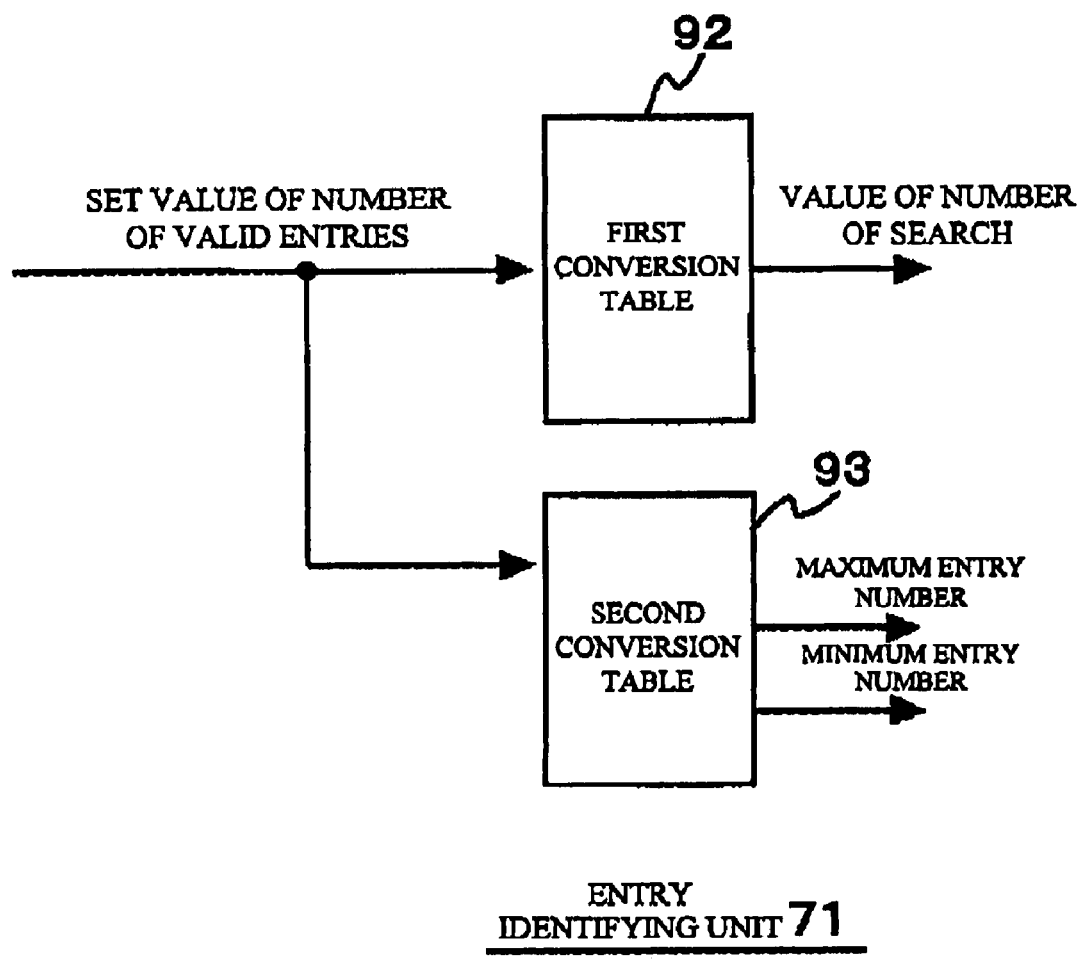
FIG. 8 is a block diagram showing a configuration of an entry identifying unit.

A configuration of the entry identifying unit 71 is shown in FIG. 8. The entry identifying unit 71 has a first conversion table 92 and a second conversion table 93. A set value of a number of valid entries entered to the first conversion table 92 represents the number of entries registered in a routing map which is referenced in destination search.

The first conversion table 92 calculates a value of number of search which sets the number of times to search the memory 78 from the set value of a number of valid entries. For example, when the number of entry for a channel is 256 entries (nodes), as 256 is the eighth power of 2, the number of times to search becomes 9 times by adding a value of +1.

The second conversion table 93 is fed with the set value of a number of valid entries and outputs a maximum entry number and a minimum entry number. The minimum entry number is the least number of ID numbers of the nodes registered (0), and similarly, the maximum entry number represents the greatest number of the ID numbers of the nodes registered (the set value of a number of valid entries). The minimum entry number is output to the minimum selector 74 and the maximum entry number is output to the maximum selector 75. The value of number of search is output to the status controlling unit 70.

The minimum selector 74 is fed with the minimum entry number from the entry identifying unit 71. The minimum selector 74 selects and outputs any one of the aforementioned minimum entry number, the previous entry number, or the entry number derived from the output of the dividing and holding unit 77 with an added value of +1, according to the control of the status controlling unit 70.

Similarly, the maximum selector 75 is fed with the maximum entry number from the entry identifying unit 71. The maximum selector 75 selects and outputs any one of the aforementioned maximum entry number, the previous entry number, or the entry number derived from the output of the dividing and holding unit 77 with an added value of −1, according to the control of the status controlling unit 70.

The summing unit 76 adds the entry number of the minimum selector 74 and the entry number of the maximum selector 75. The dividing and holding unit 77 divides the added value of the summing unit 76 by 2 and holds the result of the division.

Figure 9:
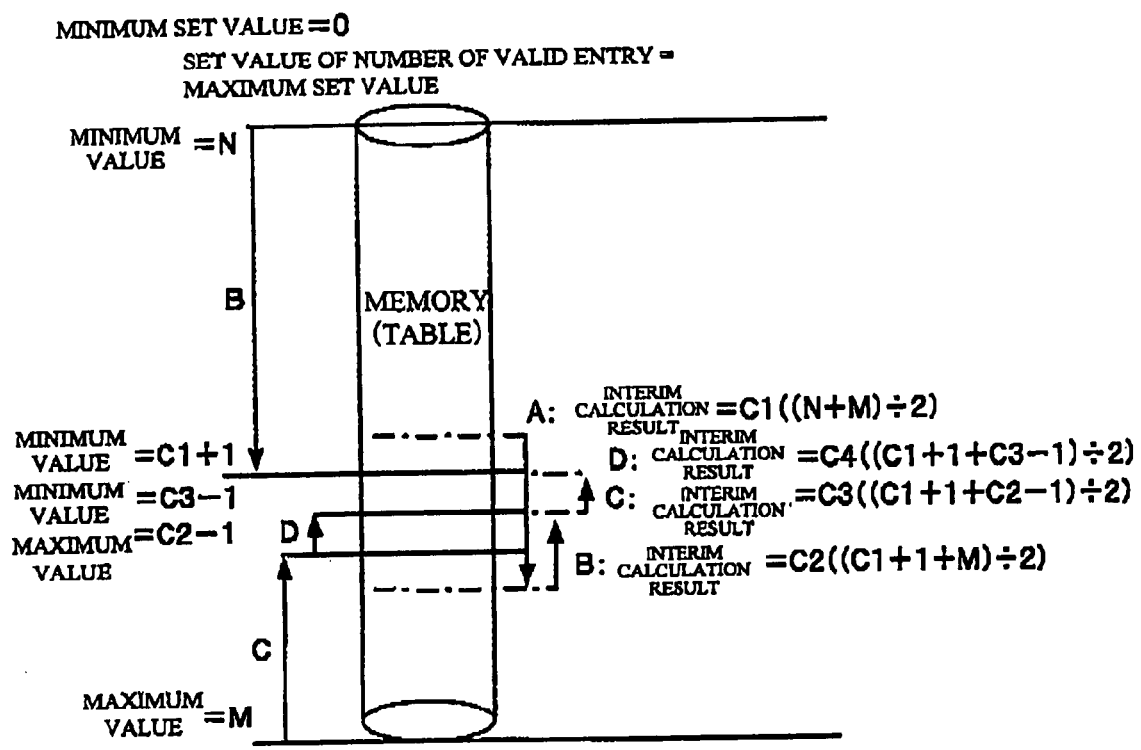
FIG. 9 is an illustration diagram of a binary tree search.

In reference with FIG. 9, a search method of the second embodiment is described. In the second embodiment, a binary tree search is used. FIG. 9 illustrates the concept of a method of the binary tree search. A minimum set value of a memory which the channel subject to search uses is set as N and that of a maximum set value is set as M. To simplify the explanation, the set value of a number of valid entries is set as the maximum set value and the minimum set value is set as the value of 0.

In the binary tree search, an intermediate value between the maximum set value and the minimum set value is calculated first. More specifically, an equation of $(N+M)/2=C1$ is calculated, and the entry data at this address is compared with an ID of the received data. For example, when an ID of received data is smaller than the entry data, this entry data is assumed to be registered at a higher memory address. Consequently, the minimum selector 74 selects the value of the previous value C1 held by the dividing and holding unit 77 with an added value of +1. The maximum selector 75 selects the previous value of M as is. These controls are carried out by the status controlling unit 70. As these values are added by the summing unit 76 and divided by 2 by the dividing and holding unit 77, the equation of $(C1+1+M)/2=C2$ is calculated. By a large-or-small comparison of the entry data obtained in this way with the received ID, the next address is generated in sequence and the entry data which matches the ID of the received data is searched from the memory 78.

The entry checking unit 80 judges whether the entry data read out from the table 78 is normal data or not. The judged result is output to the status controlling unit 70.

Figure 10:
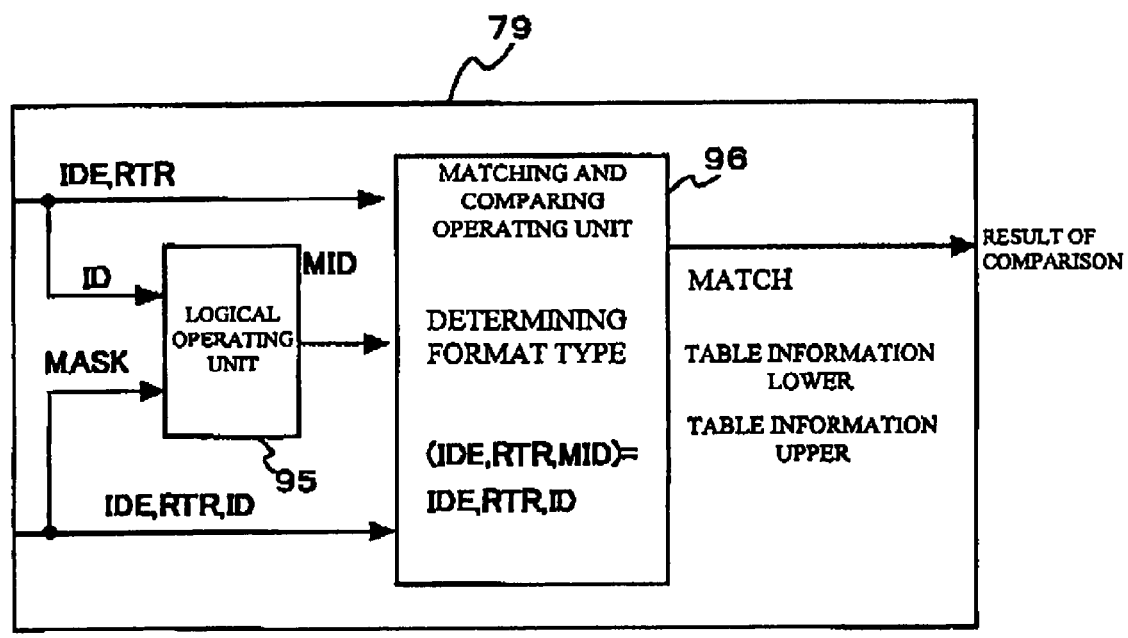
FIG. 10 is a block diagram showing a configuration of a matching and comparing unit.
Figure 11:
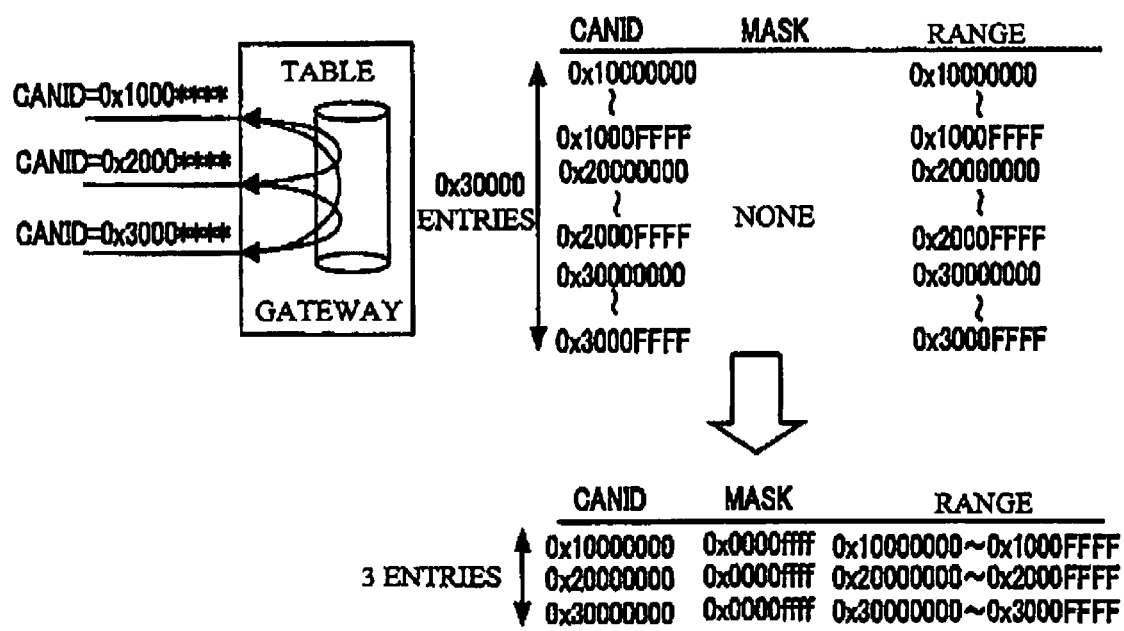
FIG. 11 is an illustration diagram of a masking process.

The matching and comparing unit 79 compares an entry data read out from the table 78 with an ID of received data. In FIG. 10, a configuration of the matching and comparing unit 79 is shown. As shown in FIG. 10, the matching and comparing unit 79 is provided with a logical operating unit 95 and a match comparison operator 96. The logical operating unit 95 refines search ranges by superposing a mask over an ID of received data as shown in FIG. 11. The matching and comparing unit 79 compares the mask superposed ID number with the entry data read out and judges whether the both match or not.

For example, as shown in part (A) of FIG. 12, when random ID numbers (the values shown in the drawing represent ID numbers) are given to nodes of four CAN buses A, B, C, and D connected with the gateway apparatus 1, the match of the ID must be detected by the maximum comparisons of 12 times. On the contrary, as shown in part (B) of FIG. 12, by setting the same values to a few upper bits for the nodes on the same bus, it is possible to determine which channel the data comes from by comparisons of four times.

Figure 13A:
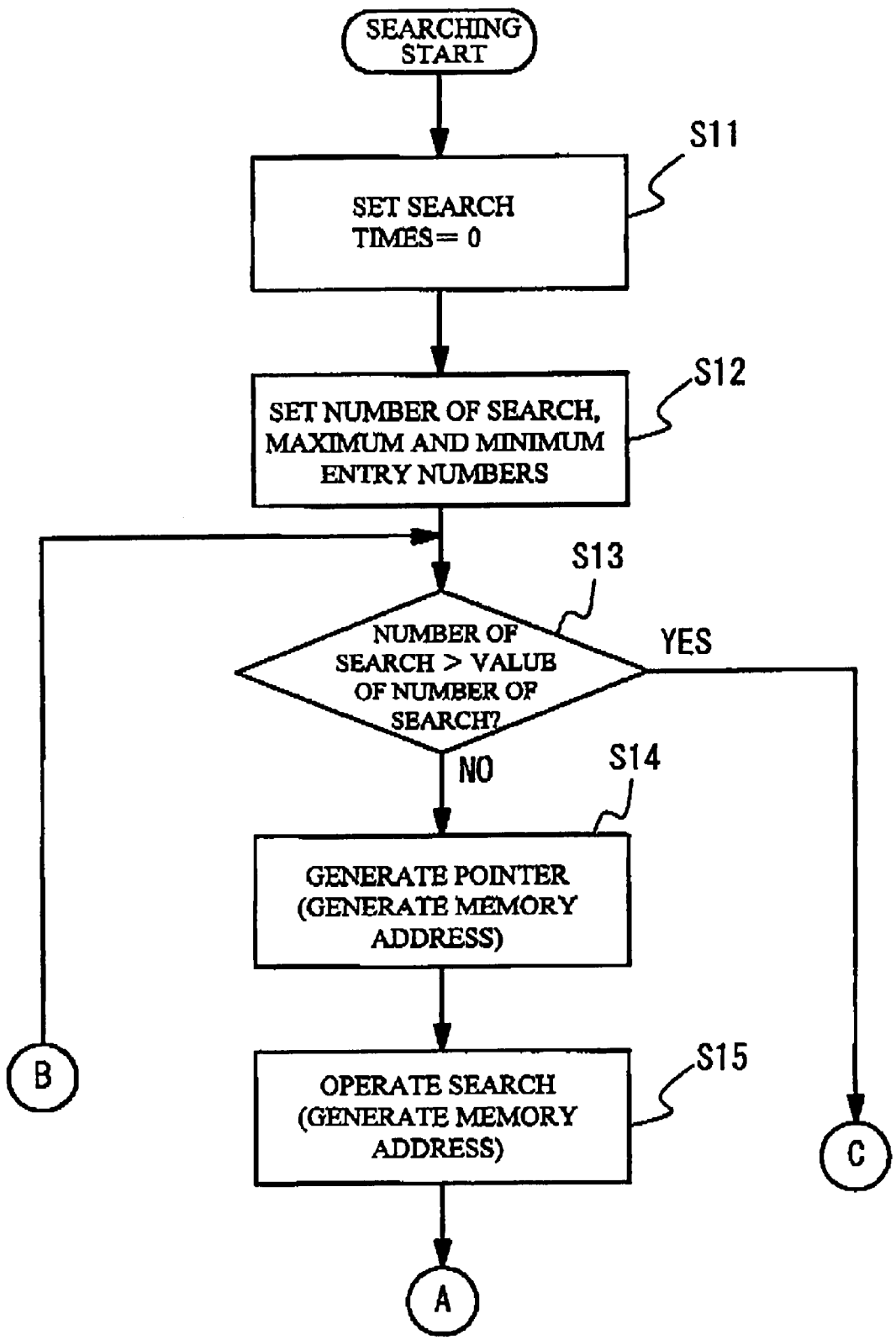
FIGS. 13A and 13B are flowcharts showing a processing procedure of the search engine unit.
Figure 13B:
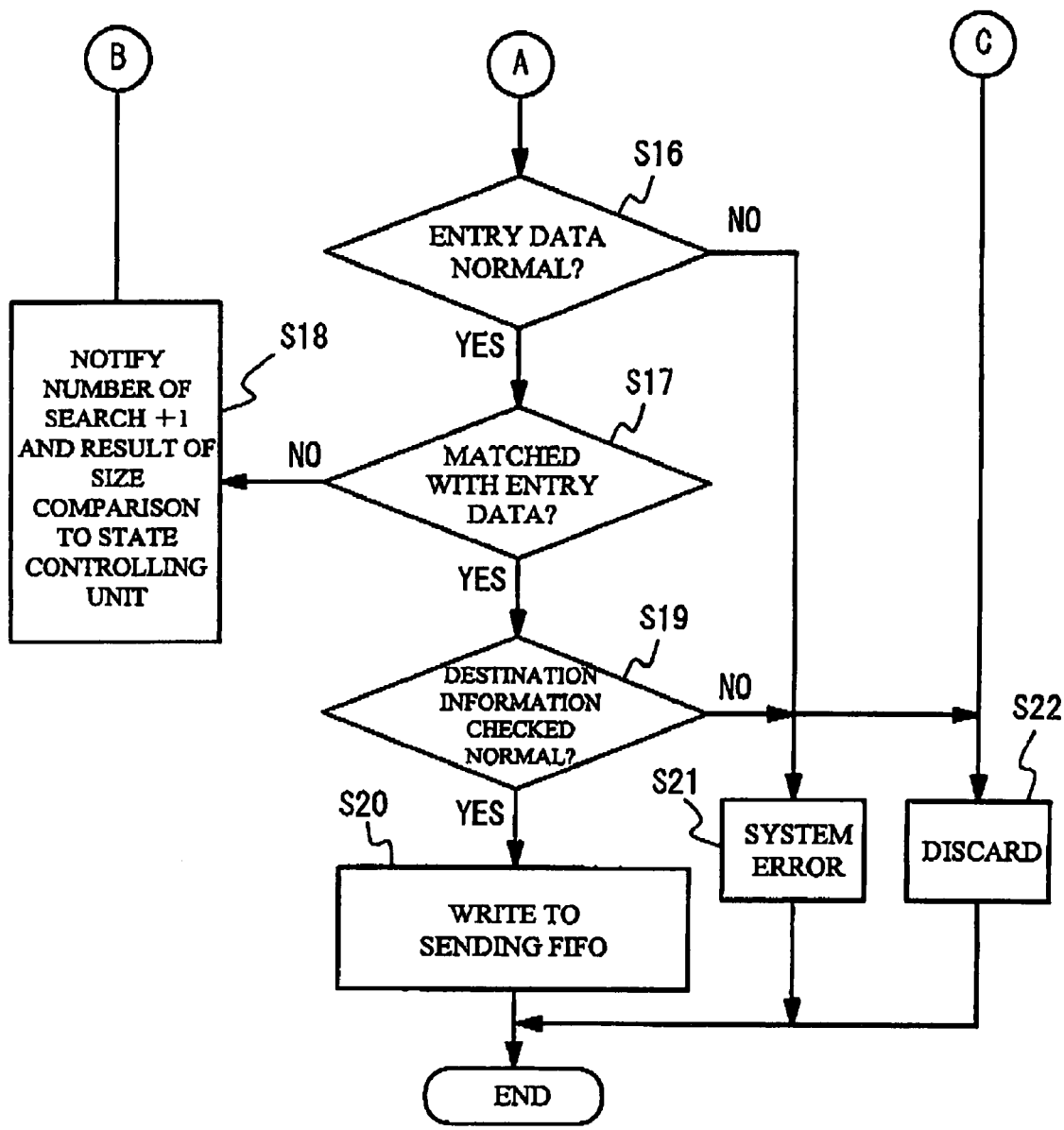

In reference with flowcharts shown in FIGS. 13A and 13B, a processing procedure of the search engine unit 11 is described.

When search is started, the status controlling unit 70 first sets the search time to a value of 0 (step S11). In synchronous with this process, the entry identifying unit 71 sets the value of number of search according to the number of entries (step S12). The value of number of search is notified from the entry identifying unit 71 to the status controlling unit 70.

The status controlling unit 70 compares the number of search times with the value of number of search notified from the entry identifying unit 71 (step S13), and when the number of search times is less than the value of number of search (step S13; YES), based on an initial value or the information of a previous large-or-small comparison, a pointer address of a memory is generated (step S14). The minimum selector 74 is fed with a minimum entry number from the entry identifying unit 71. Similarly, the maximum selector 75 is fed with an maximum entry number from the entry identifying unit 71. The summing unit 76 adds the minimum entry number and the maximum entry number. The dividing and holding unit 77 divides the added value by 2 and holds the result. The result value becomes an address of the pointer.

When an address of the pointer is generated, the entry data represented by the pointer address is read out from the memory 78 (step S15). The read out entry data is fed to the entry checking unit 80 and is judged whether the data is normal or not (step S16). When the value is not normal (step S16: NO), it is processed as a system error. When the entry data is normal (step S16; YES), whether the ID of the received data matches with the entry data or not is judged by the matching and comparing unit 79 (step S17). In case the both do not match (step S17: NO), the number of search times is incremented and the result of the large-or-small comparison in the matching and comparing unit 79 is output to the status controlling unit 70 (step S18), and steps in and following the step S13 are repeated. The status controlling unit 70, according to the result of the large-or-small comparison, controls the minimum selector 74 and the maximum selector 75, and the pointer address corresponding to the result of the previous comparison is generated. Meanwhile, when the both match (step S17; YES), the destination information of the matched entry data is checked (step S19), and when normal, is written to the sending FIFO 21 (step S20). In case the destination information is not normal (step S19; NO), either it is processed as a system error (step S21) or the frame data is discarded (step S22). Further, the status controlling unit 70, when the number of search times becomes greater than the value of number of search (step S13: YES), discards the frame data received (step S22).

Figure 14A:
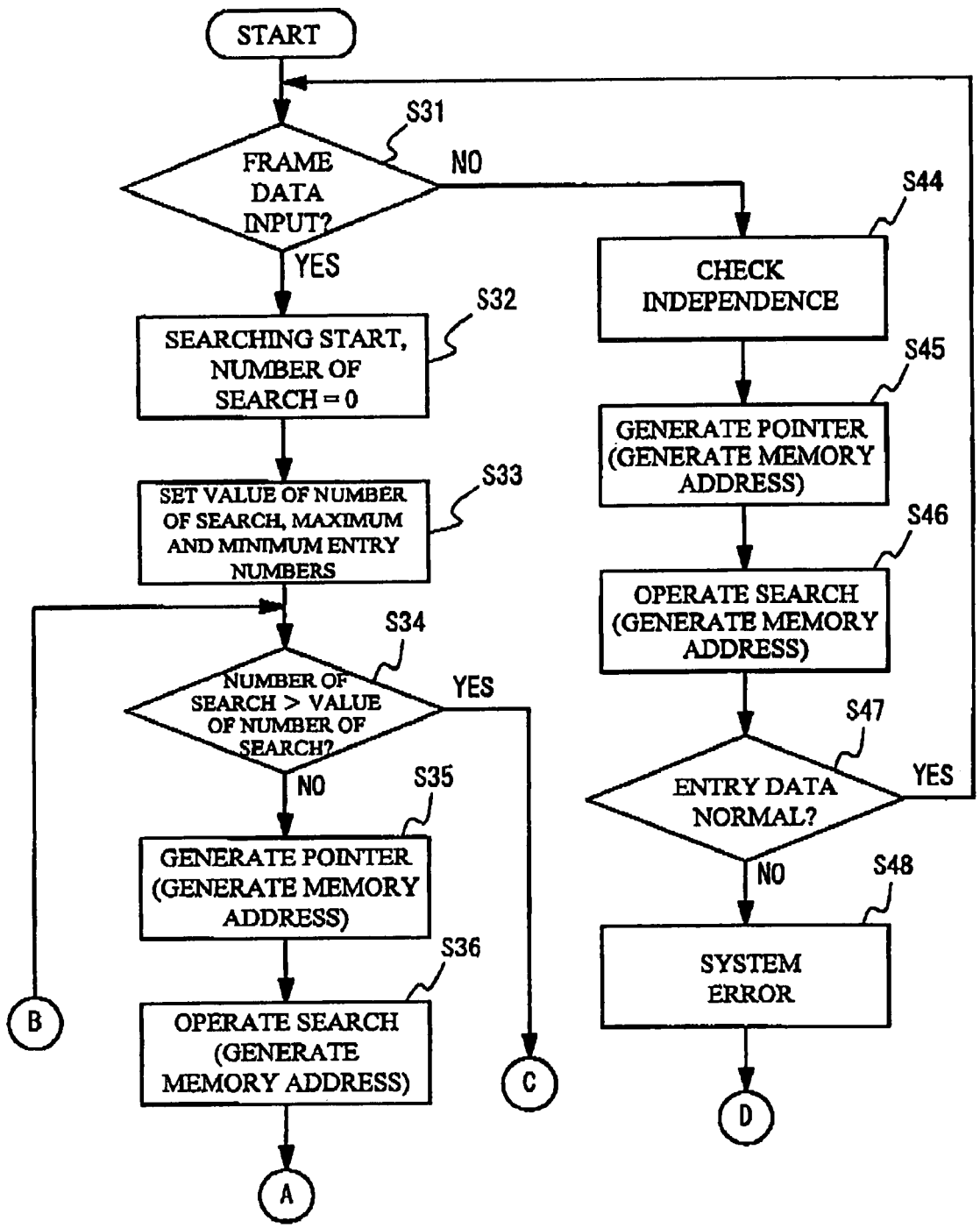
FIGS. 14A and 14B are flowcharts showing a processing procedure particularly of a self-checking process of the search engine unit.
Figure 14B:
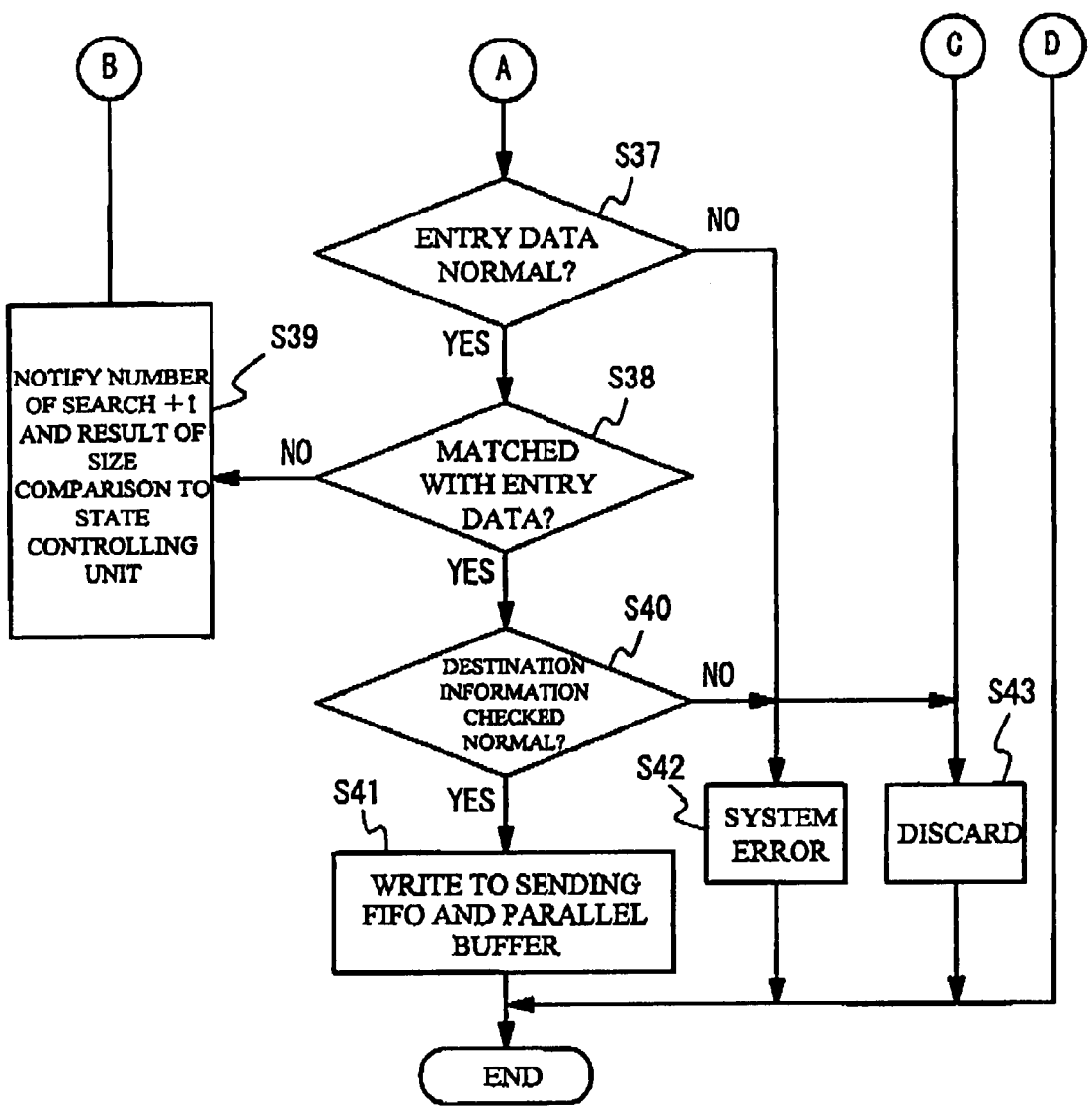

The status controlling unit 70, while being in an idle state not receiving any frame data, may conduct a normality confirmation operation for map information. This process is described in reference with flowcharts shown in FIGS. 14A and 14B.

The status controlling unit 70, while being in the idle state not receiving any frame data (step S31), conducts a self-check (step S44). The status controlling unit 70 generates a pointer address (step S45) first, and searches the entry data stored in the corresponding address and takes out the data (step S46). Thereafter, the normality of entry data taken out is judged (step S47). When the searched entry data is judged as normal (step S47; YES), the process is finished. When an error is detected (step S47; NO), it is processed as a system error (step S48).

Figure 15:
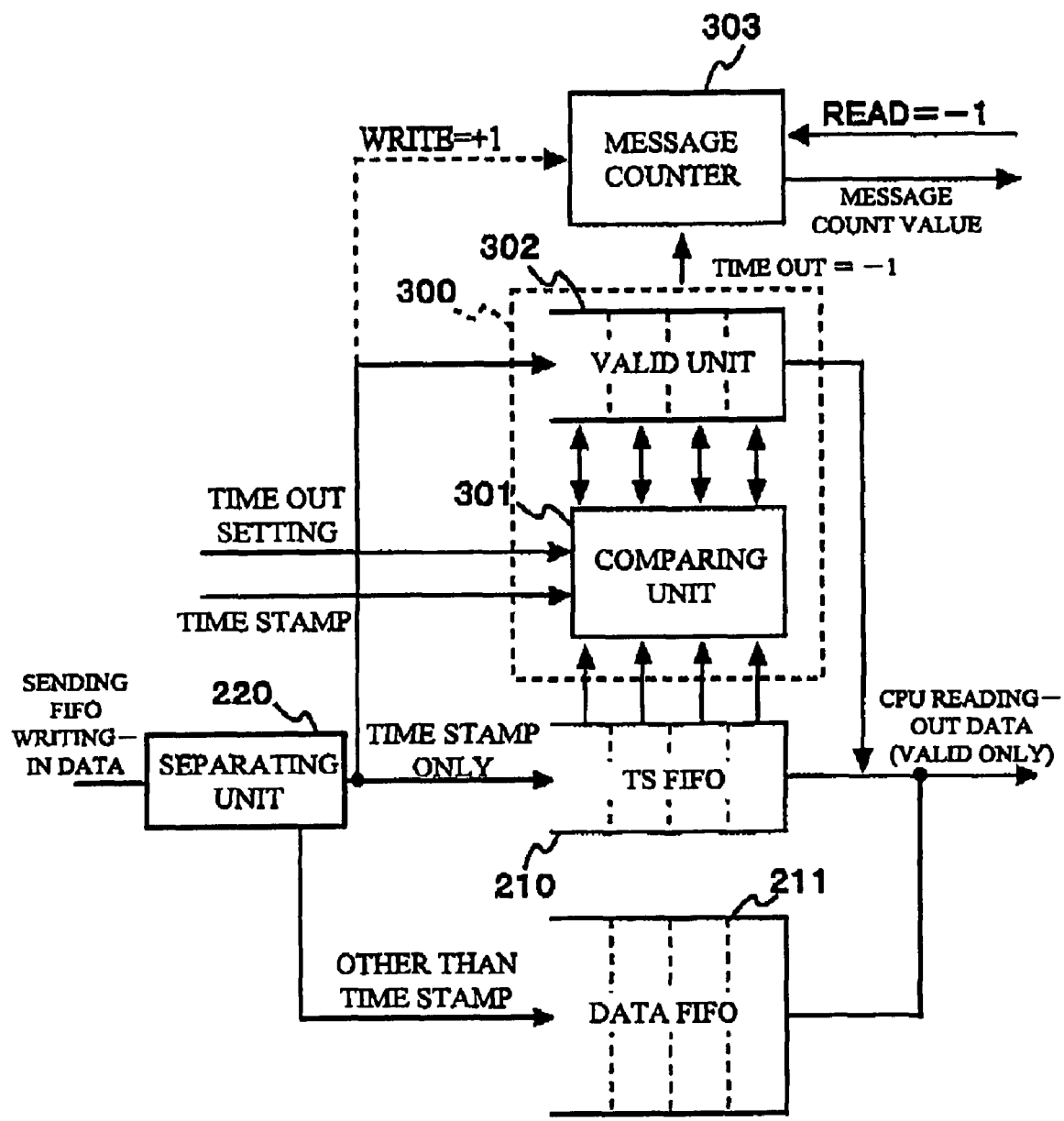
FIG. 15 is a block diagram showing configurations of a sending FIFO and a data discarder that discards invalid frame data.

FIG. 15 shows a configuration of the sending FIFO 21 and that of discarding frame data according to a delay time in the process of frame data.

As shown in FIG. 15, the sending FIFO 21 is provided with a time stamp FIFO 210 which stores a time stamp and a data FIFO 211 which stores frame data. A data discarder 300 that discards data according to a delay time in process is provided with a comparing unit 301 and a valid unit 302.

The time stamp added frame data output from the search engine unit 11 is separated to a time stamp and an area other than the time stamp by a separating unit 220, and are respectively held in the time stamp FIFO 210 (hereinafter abbreviated also as TS FIFO) and the data FIFO 211. The separating unit 220 takes out the time stamp inserted at a predefined location of frame data and outputs to the TS FIFO 210.

The valid unit 302 stores validation data, where a value of 1 is stored for the valid data, which represents the data held in the time stamp FIFO 210 and in the data FIFO 211 valid.

The comparing unit 301 is fed with a time stamp and timeout setting information. The time stamp is the information representing the current time issued by the time stamp unit 61. The timeout setting information is the information set by the CPU 2 and is the setting of a permissible delay time to take for frame data entered in the gateway hardware macro section 17 to be output from the gateway hardware macro section 17.

The valid unit 302, the time stamp FIFO 210 and the data FIFO 211 are respectively configured with a FIFO of the same configuration.

Therefore, the time stamp information of the frame data written to the data FIFO 211 is written to the same area of the time stamp FIFO 210. Similarly, the validation data that represents whether the frame data being valid data or invalid data is written to the same area of the valid unit 302.

The comparing unit 301 reads out the time stamp in the area where the data representing being valid is stored in the valid unit 302 from the TS FIFO 210, and compares that with the time stamp information representing the current time output from the time stamp unit 61. When the difference between the time in the time stamp stored in the TS FIFO 210 and the current time exceeds the timeout setting information notified from the CPU 2, the comparing unit 301 changes validation data in the valid unit 302 to that of invalid data, i.e. stores a value of 0. When the validation data is changed to that of invalid data, the value in a message counter 303 is subtracted by a value of 1.

The CPU 2 reads out the value of the message counter 303 at a predefined timing. When the value of the message counter 303 becomes a predefined value, the CPU 2 reads out the frame data from the data FIFO 211. In this case, the frame data for which the data representing being invalid is stored in the valid unit 302 is discarded without being read out.

Figure 16:
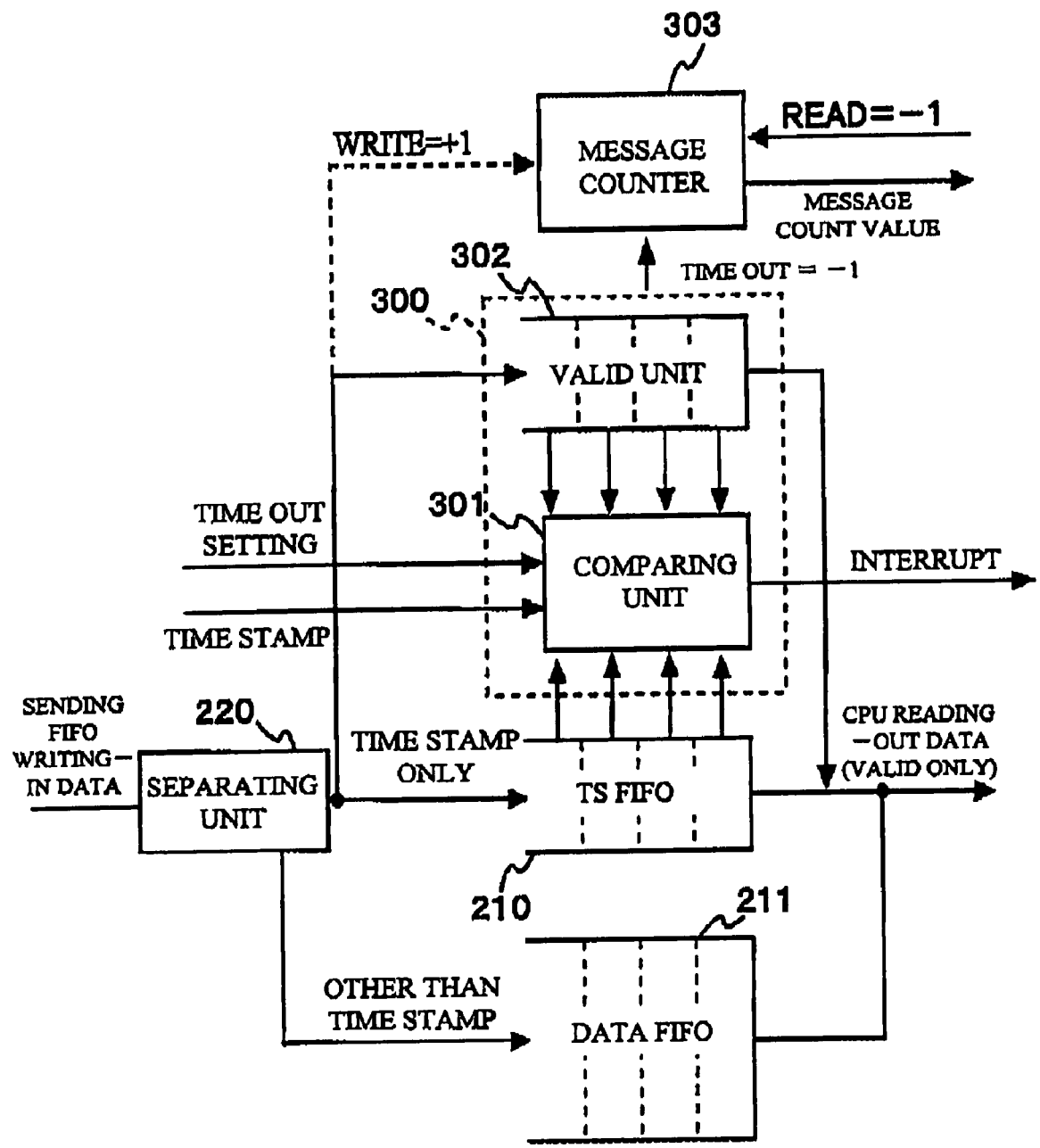
FIG. 16 is a block diagram showing another configurations of the sending FIFO and the data discarder that discards invalid frame data.

When the difference between the time in the time stamp stored in the TS FIFO 210 and the current time exceeds the timeout setting information notified from the CPU 2, the comparing unit 301 may be configured to output an interrupt signal to the CPU 2. This configuration is shown in FIG. 16. When the CPU 2 is fed with the interrupt signal, it reads out the frame data stored in the data FIFO 211 in priority.

In FIGS. 15 and 16, the configurations of discarding the frame data whose dwell time in the gateway hardware macro section 17 exceeded the timeout time by hardware are shown. However, other than those, by the software control of the CPU 2, the frame data whose dwell time exceeded the timeout time may be discarded by software.

Figure 17:
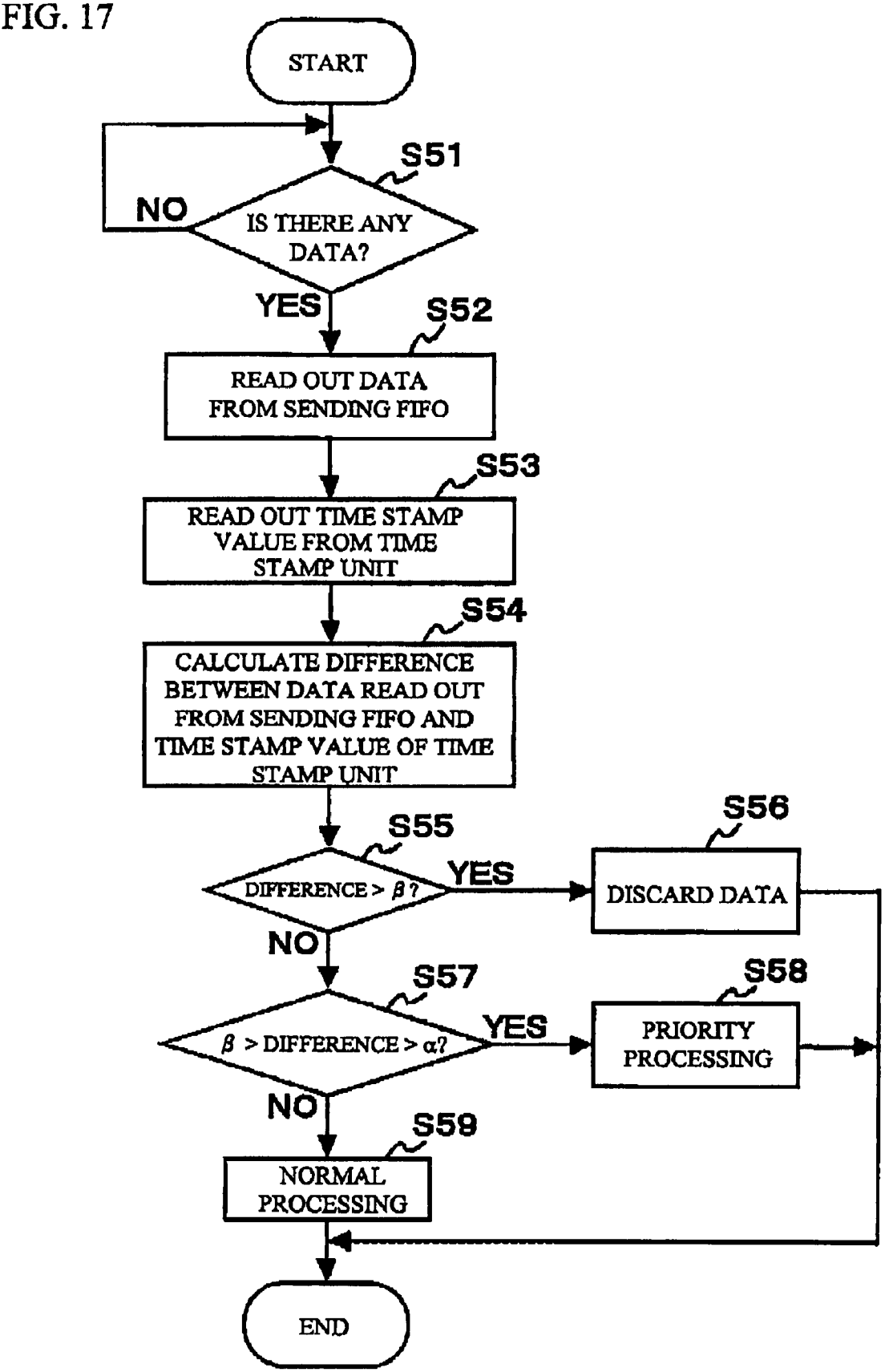
FIG. 17 is a flowchart showing a procedure of discarding invalid frame data process by the CPU.

In reference with a flowchart shown in FIG. 17, a procedure of discarding the frame data whose dwell time exceeded the timeout time by the CPU 2 is described.

The CPU 2 references with the message counter 303 at a predefined time interval and judges whether processing data is stored in the sending FIFO 21 (step S51). When processing data is stored in the sending FIFO 21 (step S51; YES), the CPU 2 reads out the processing data from the sending FIFO 21 (step S52) and reads out the time stamp information representing the current time from the time stamp unit 61 (step S53).

The CPU 2 compares the time stamp information appended to the frame data read out from the sending FIFO 21 with the current time information read out from the time stamp unit 61 (step S54).

When the difference between the time in the time stamp and the current time is greater than a first criterion value $\beta$ (step S55; YES), the frame data is discarded (step S56). When the difference between the time in the time stamp and the current time is smaller than the first criterion value β and is greater than a second criterion value α (step S57; YES), the CPU 2 judges that the process of the frame data is delayed and processes the frame data in priority (step S58). The first criterion value β is set as a greater value than that of the second criterion value α.

When the difference between the time in the time stamp and the current time is smaller than the second criterion value α (step S57; NO), the CPU 2 judges that the process of the frame data is not delayed and processes normally (step S59).

FIGS. 18A through 18D show configurations of the frame data transferred in the gateway hardware macro section 17. FIG. 18A shows the configuration of the frame data input to the selector unit 52. FIG. 18B shows the configuration of the frame data with a time stamp appended output from the selector unit 52 to the search engine unit 11. FIG. 18C shows the configuration of the frame data with the time stamp appended written to the sending FIFO 21. FIG. 18D shows the configuration of the frame data which the CPU 2 reads out from the sending FIFO 21. The asterisk mark shown in FIGS. 18B through 18D represents being composed of a plurality of bits.

A symbol RXCH in FIG. 18B denotes information indicating a received channel, and is added to frame data at the selector unit 52 in the gateway hardware macro section 17 after the frame data is received. It is to be noted that frame data that conforms to the CAN protocol does not have any data indicative of the original received channel. In order to determine whether the ID of the frame data to be routed coincides with ID used in the received channel, data indicating which channel is used to receive the frame data is needed for each frame data. Particularly, the unique process of adding the received channel RXCH to the received frame data after it is received is very effective to the gateway apparatus consistent with a communication protocol in which the frame data does not include a sender apparatus (ECU) such as CAN.

Figure 19:
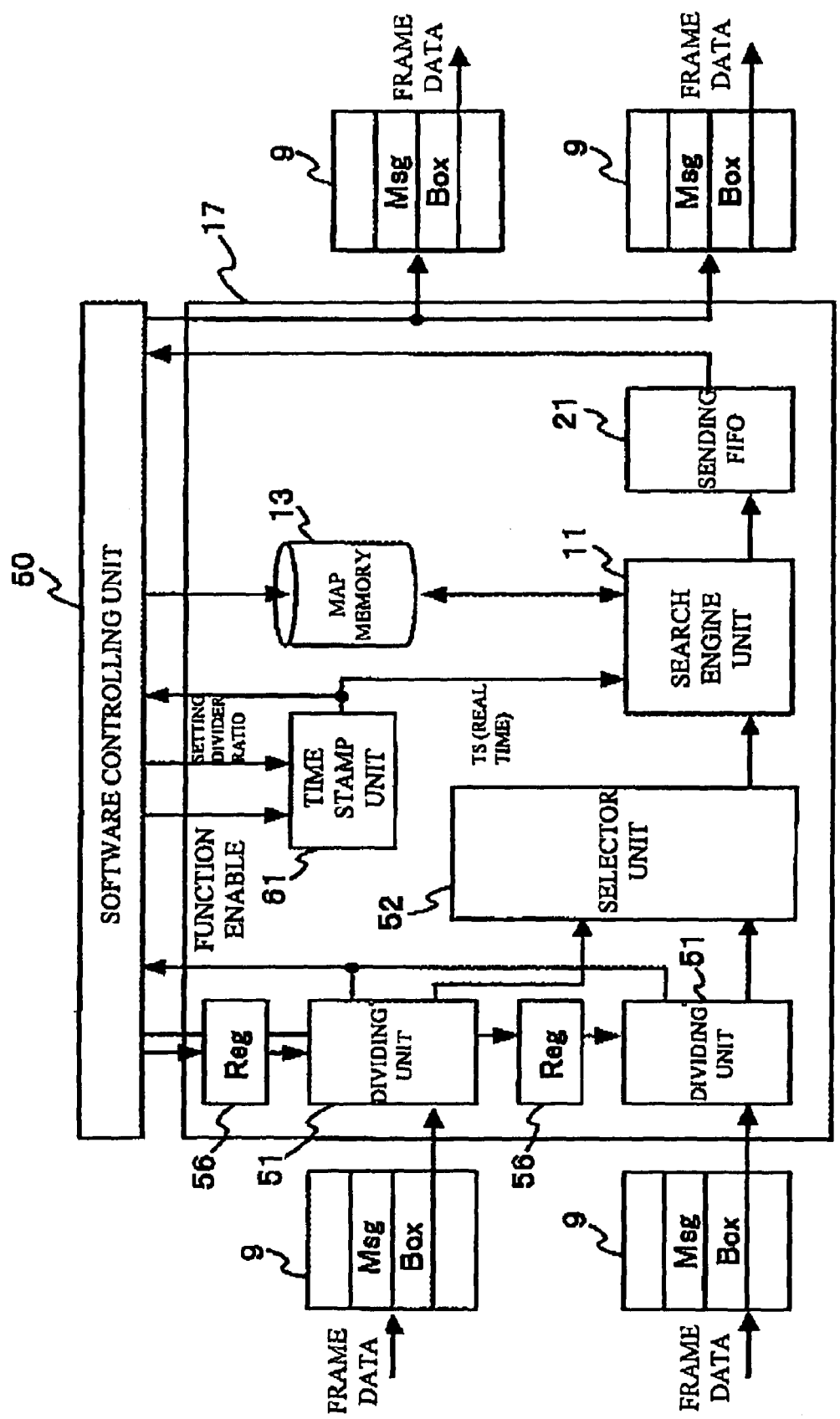
FIG. 19 is an illustration showing another configuration of the gateway hardware macro section.

The time stamp information appended to frame data may be appended only to the data judged as valid frame data by the search engine unit 11. FIG. 19 shows the configuration in that case. In view of measuring a dwell time in the gateway hardware macro section 17, while the configuration in FIG. 2 measures the strict dwell time, the configuration shown in FIG. 19 allows the scale of hardware to be small.

While discarding frame data is mainly performed by discarding by software, when discarding by hardware, the configuration becomes as shown in the drawing in FIG. 16.

Figure 20:
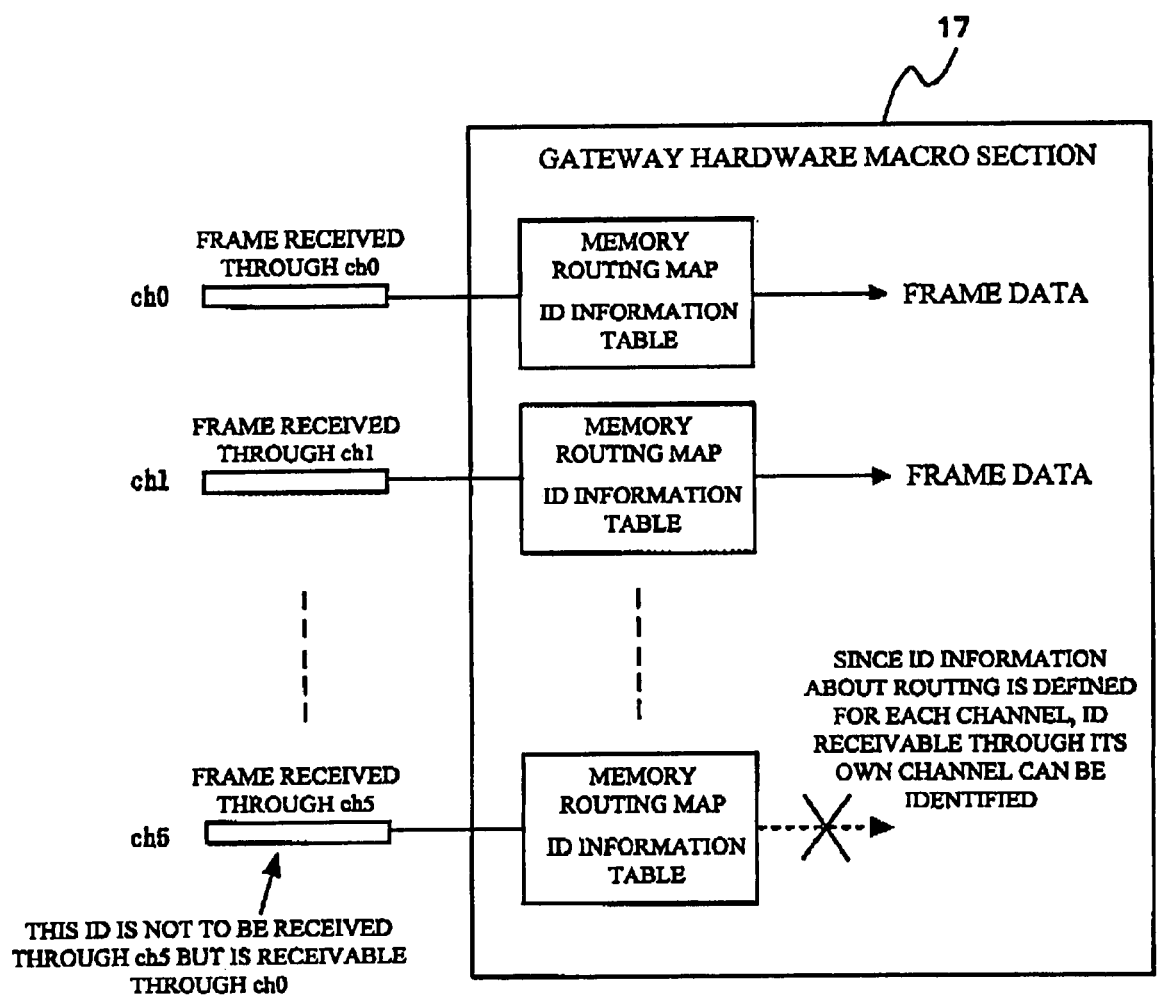
FIG. 20 illustrates a configuration in which routing maps are provided to the respective communication channels
Figure 21:
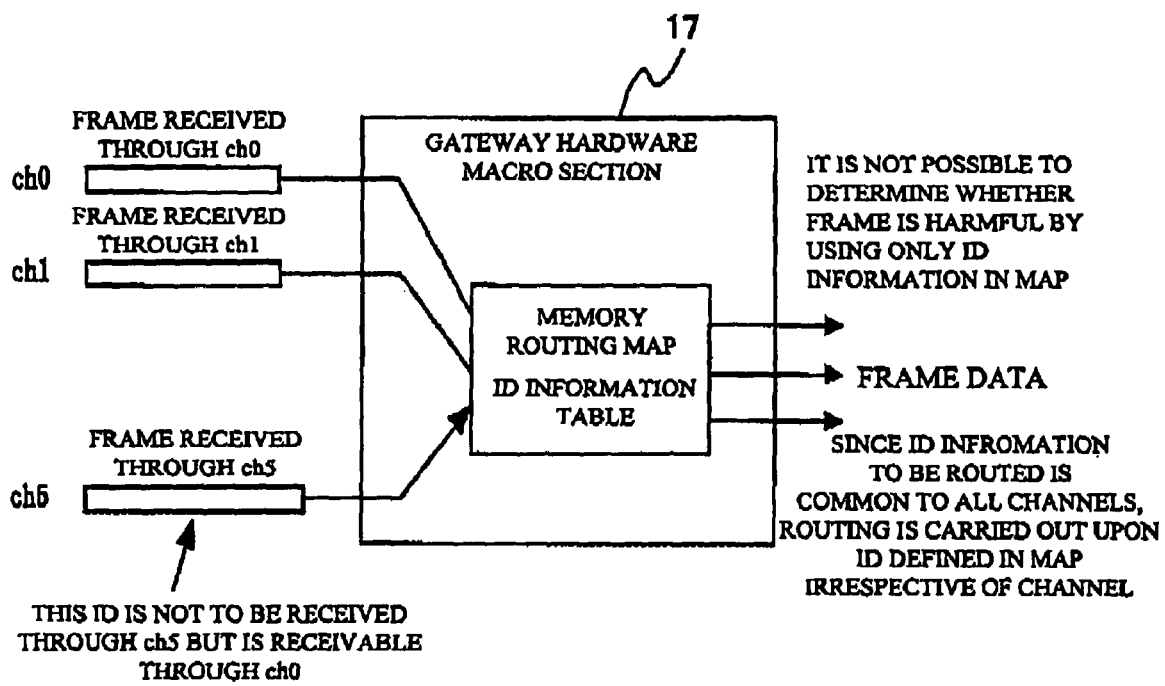
FIG. 21 illustrates a conventional configuration in which a routing map is provided commonly to the multiple communication channels.

FIG. 20 shows a configuration in which routine maps are provided for respective communication channels. FIG. 21 shows a configuration in which a routing map is provided commonly to all communication channels. The use of the common routing map is capable of reducing the memory capacity. However, the configuration shown in FIG. 21 has a problem that frame data having ID information recorded in the routing map is routed irrespective of the received communication channel. For example, there is a case where harmful frame data should be blocked. Such harmful frame data may be a case where frame data having ID information to be received through only channel 0 is received through another channel. Such incorrect frame data should not be routed. The use of the routing maps to the respective communication channels shown in FIG. 20 can block transfer of incorrect frame data. However, the configuration shown in FIG. 20 needs a large memory capacity.

With the above in mind, as shown in FIG. 22, information indicative of a channel allowed to receive frame data is defined in the routing map. Information indicating a channel allowed to receive frame data is defined in association with each communication channel. Multiple channels allowed to receive frame data may be defined for each communication channel. The example of FIG. 22 uses six communication channels in total. Information indicating communication channels allowed to receive frame data is binary data that consists of six bits. For example, the receive-allowed channel information is "111111" for ID "B". Thus, frame data received through all of the six channels are routed. For ID "C", the receive-allowed channel information is "000101". Thus, frame data received through only channels 0 and 2 are routed.

Figure 23:
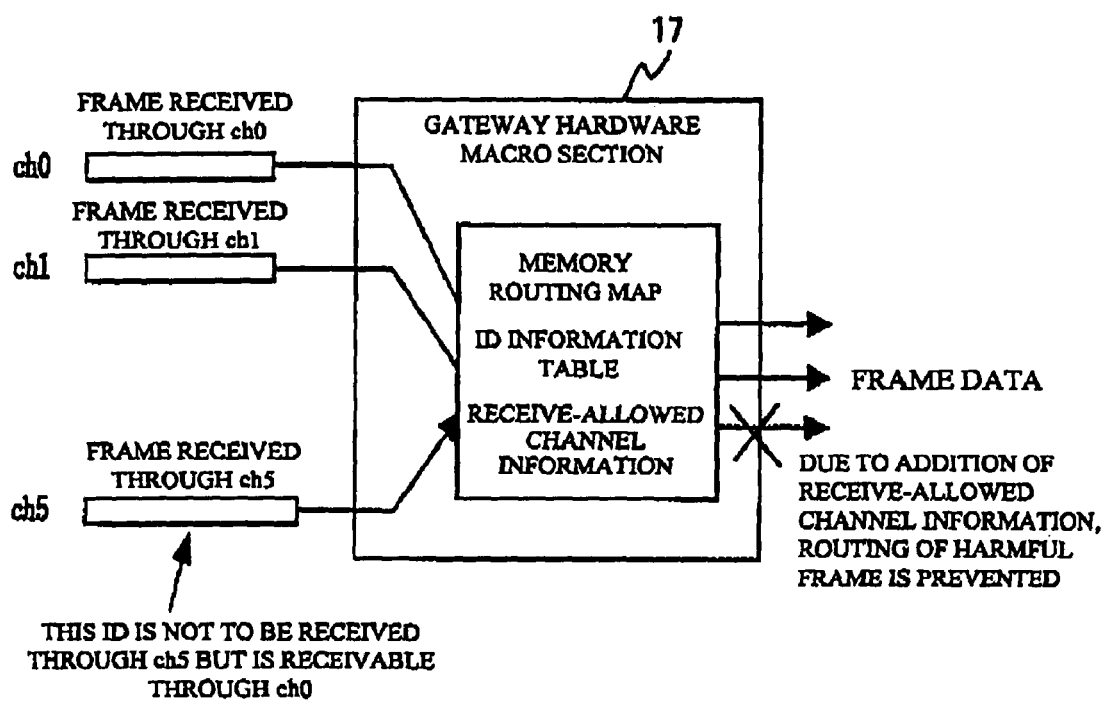
FIG. 23 illustrates a routing map that is commonly used for multiple communication channels and has the ID information table.

FIG. 23 shows routing using the search engine unit 11 using the routing map shown in FIG. 22. The search engine unit 11 reads the ID information included in received frame data. Next, the search engine unit 11 searches the routing map and identifies a channel or channels defined for the ID information acquired. Then, the search engine unit 11 determines whether the channel used to transfer frame data is included in the definition in the routing map. When the channel used to transfer frame data is included in the receive-allowed channel information defined in the routing map, the gateway hardware macro section 17 routes the received frame data to the channel to be transferred. In contrast, if the channel used to transfer frame data is not defined in the routing map, the received frame data is discarded.

In the in-vehicle gateway apparatus, there are the following two cases when frame data having ID information is routed. A first case require The frame data is transferred (loop-backed) to the sending FIFO of the above ID information in a first case, and is not transferred in a second case.

Figure 24:
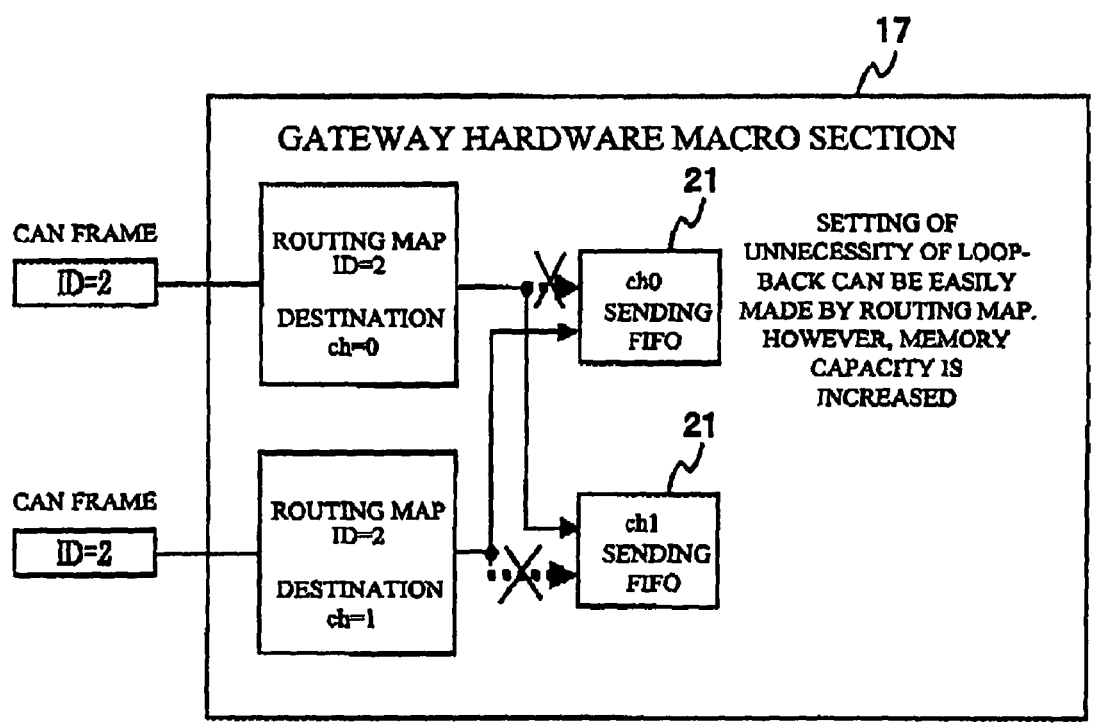
FIG. 24 illustrates a gateway hardware macro section in which routing maps are provided for the respective communication channels and shows routing.

As is shown in FIG. 24 where the routing maps are provided to the respective communication channels, the loop-back can be easily prohibited in such a manner that the own channel is not included in the destination channel information. For the purpose of reducing the memory capacity, it is desired that the routing map is provided commonly to all the communication channels.

Figure 25:
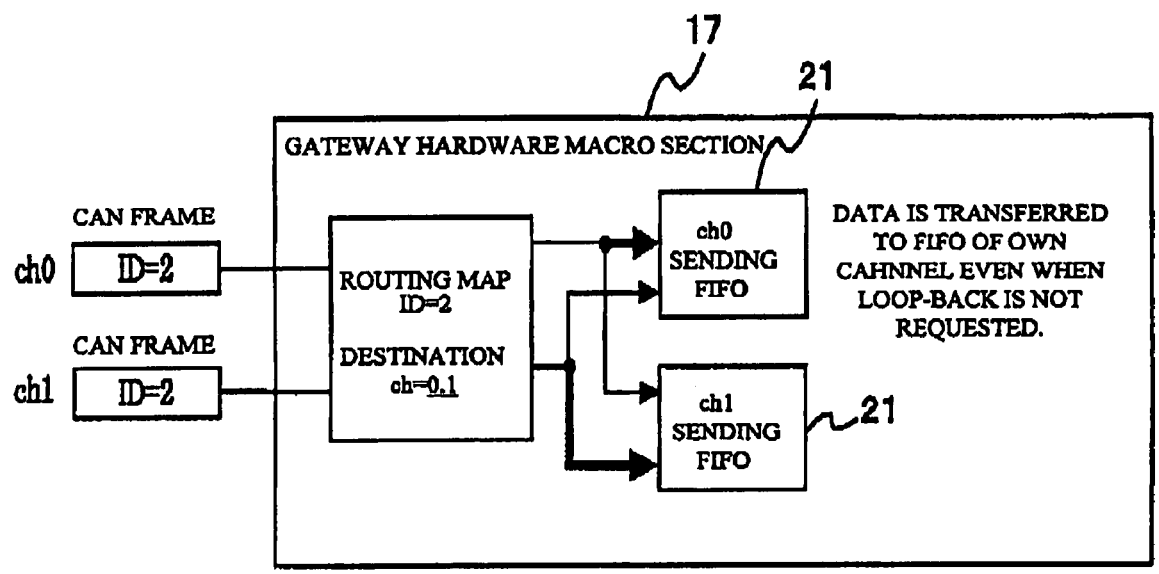
FIG. 25 illustrates another gateway hardware macro section in which a routing map commonly used for multiple communication channels is provided.

FIG. 25 shows an arrangement in which the routing map is commonly provided to all the communication channels. This arrangement has a disadvantage in that the loop-back to the own channel cannot be restrained when the loop-back is not needed. Thus, unwanted data is adversely stored in the sending FIFO. A software process may be required to avoid the above problem. However, this increases the load on the software.

Figure 26:
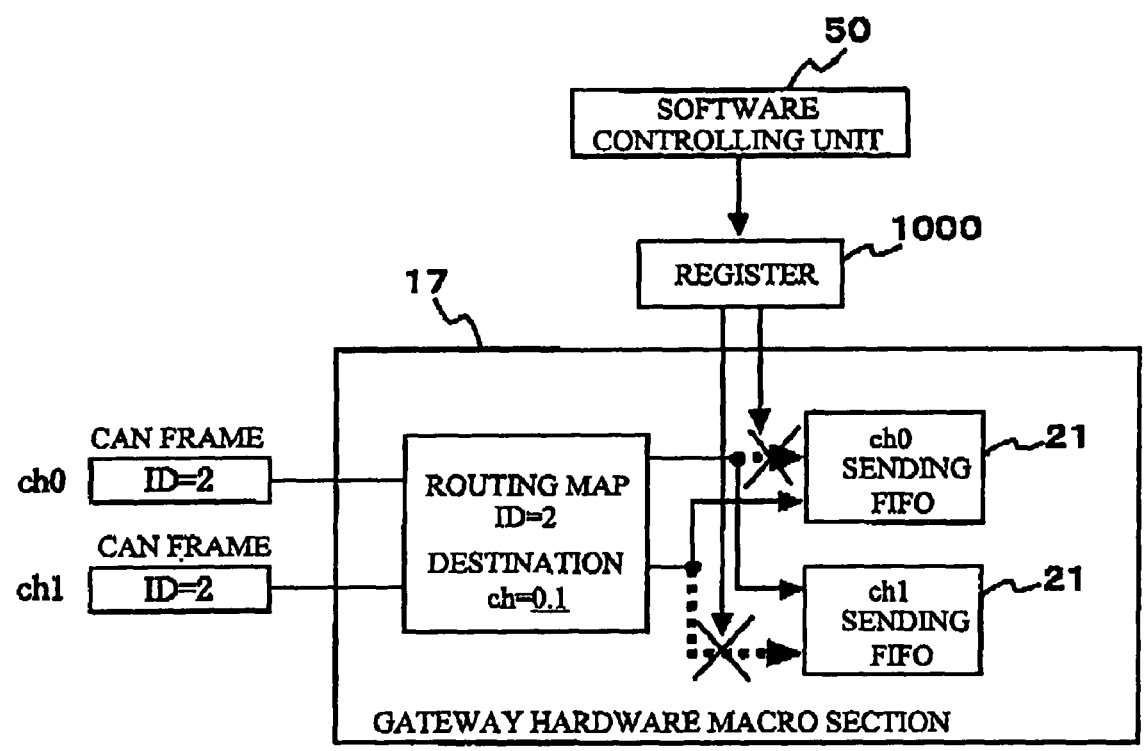
FIG. 26 illustrates yet another gateway hardware macro section capable of defining whether a loop-back transfer is allowed.

Taking the above into consideration, as shown in FIG. 26, there is provided a register 1000 for recording information by the software controlling unit 50. The search engine unit 11 inhibits the loop-back to the own channel when information indicating inhabitation of loop-back is set in the register 1000. In this manner, the loop-back can be inhibited when it is desired. Thus, it is possible to prevent unwanted data involved in the own channel from being stored in the sending FIFO 21 and to avoid the selecting process by software. This reduces the load on software. Further, it is possible to reduce the memory capacity by providing the routing map commonly to all the communication channels.

Figure 27:
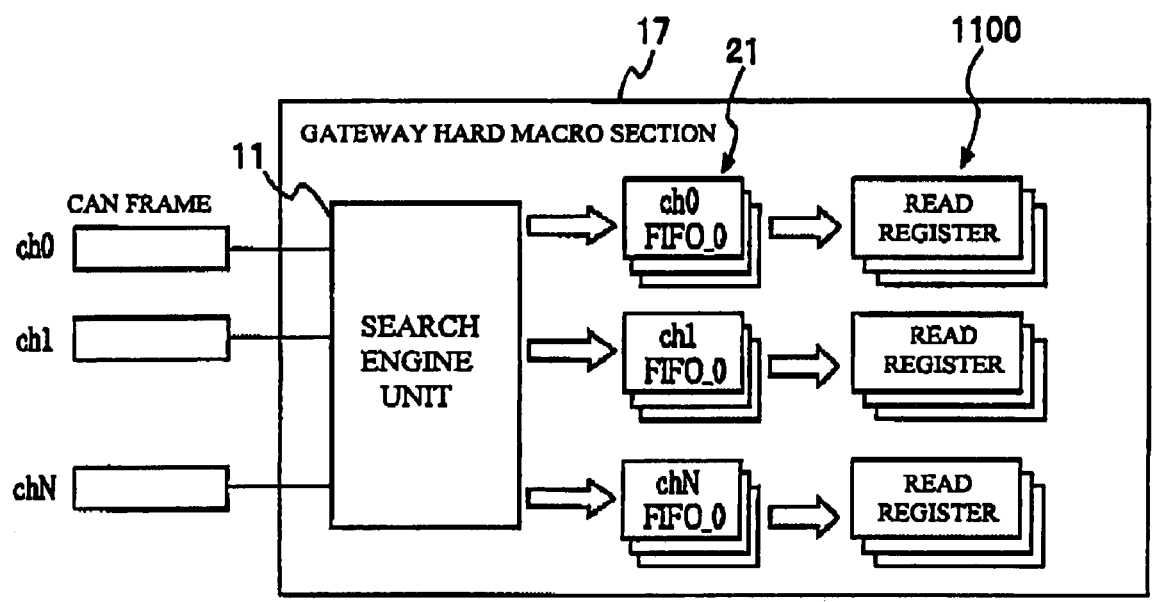
FIG. 27 illustrates conventional sending FIFOs and read registers.

The frame data routed by the search engine unit 11 is stored in the sending FIFOs 21 provided for the respective communication channels. The frame data stored in the sending FIFOs 21 are read therefrom and are stored in read registers 1100. Then, the frame data are transferred to the CANs 9 by the CPU 2. Multiple sending FIFOs 21 are provided to each channel, as shown in FIG. 27.

Figure 28:
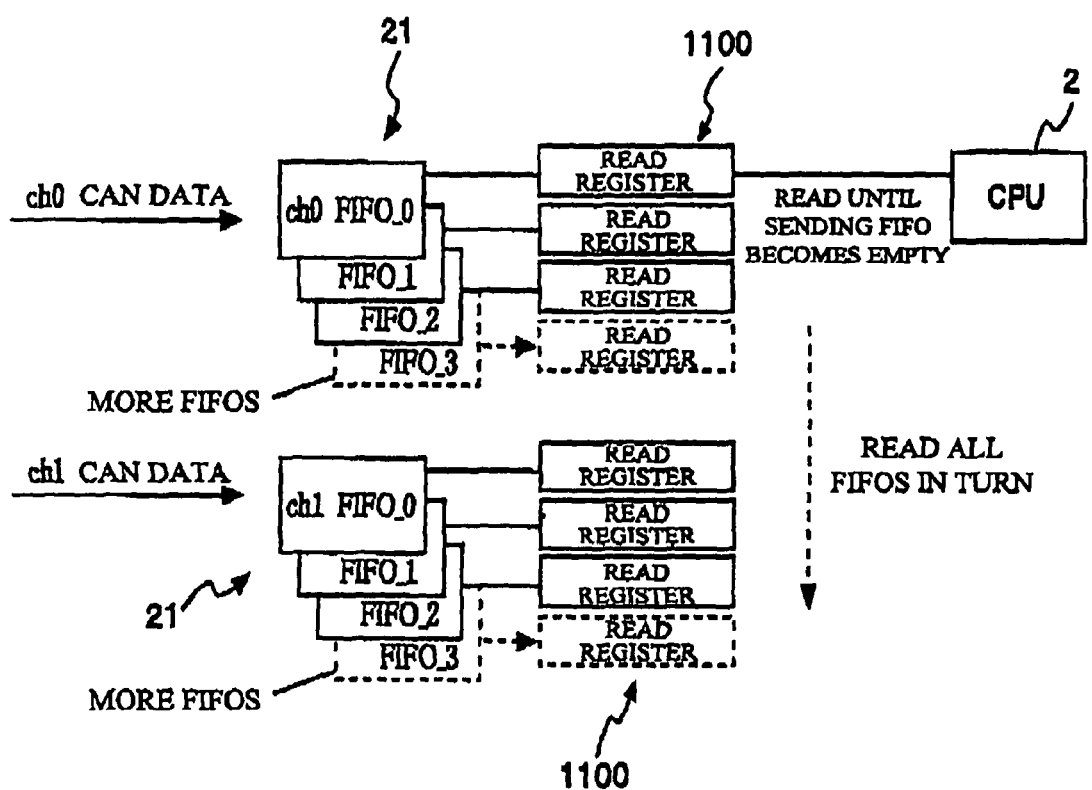
FIG. 28 illustrates an operation of the conventional sending FIFOs and the read registers.

FIG. 28 shows a conventional sequence performed when the CPU 2 reads frame data stored in the sending FIFOs 21.

The CPU 2 reads frame data from in the sending FIFOs 21, and writes the read frame data into the read registers 1100. Multiple sending registers FIFOs 21 are provided for each communication channel, and the read registers 1100 are provided to the respective sending registers FIFOs 21. The CPU 2 selects the specific sending FIFO 21 from which frame data should be read at the time when frame data should be read from the sending FIFO 21, and connects the read register 1100 to the sending FIFO 21.

In the configuration shown in FIG. 28, the number of read registers 1100 proportionally increases as the number of channel increases and the number of sending FIFOs 21 increases. An increased hardware scale increases the cost. Further, the flexibility of incorporating the configuration into a microcomputer is degraded because of an increased address area.

Figure 29:
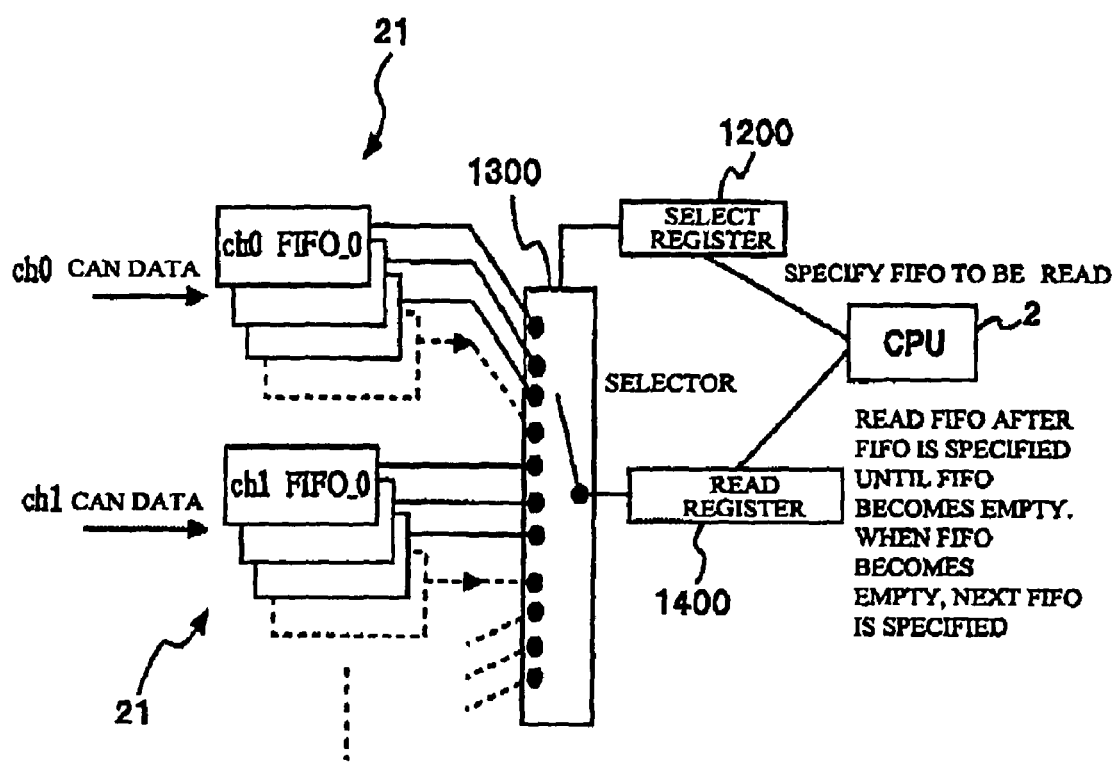
FIG. 29 illustrates sending FIFOs and a read register according to an embodiment.

Taking the above into consideration, as sown in FIG. 29, there are provided a select register 1200, a selector 1300 and a read register 1400. The select register 1200 and the read register 1400 are commonly used for the multiple communication channels.

The CPU 2 selects one of the sending FIFOs 21 from which frame data should be read, and writes the channel number and the number of the selected sending FIFO 21 into the select register 1200. The selector 1300 makes a connection between the selected sending FIFO 21 and the read register 1400 in accordance with the information written into the select register 1200. Then, the frame data is then read from the selected sending FIFO 21 and is written into the read register 1400 under the control of the CPU 2. This operation is performed until all the frame data is read from the selected sending FIFO 21.

Figure 30:
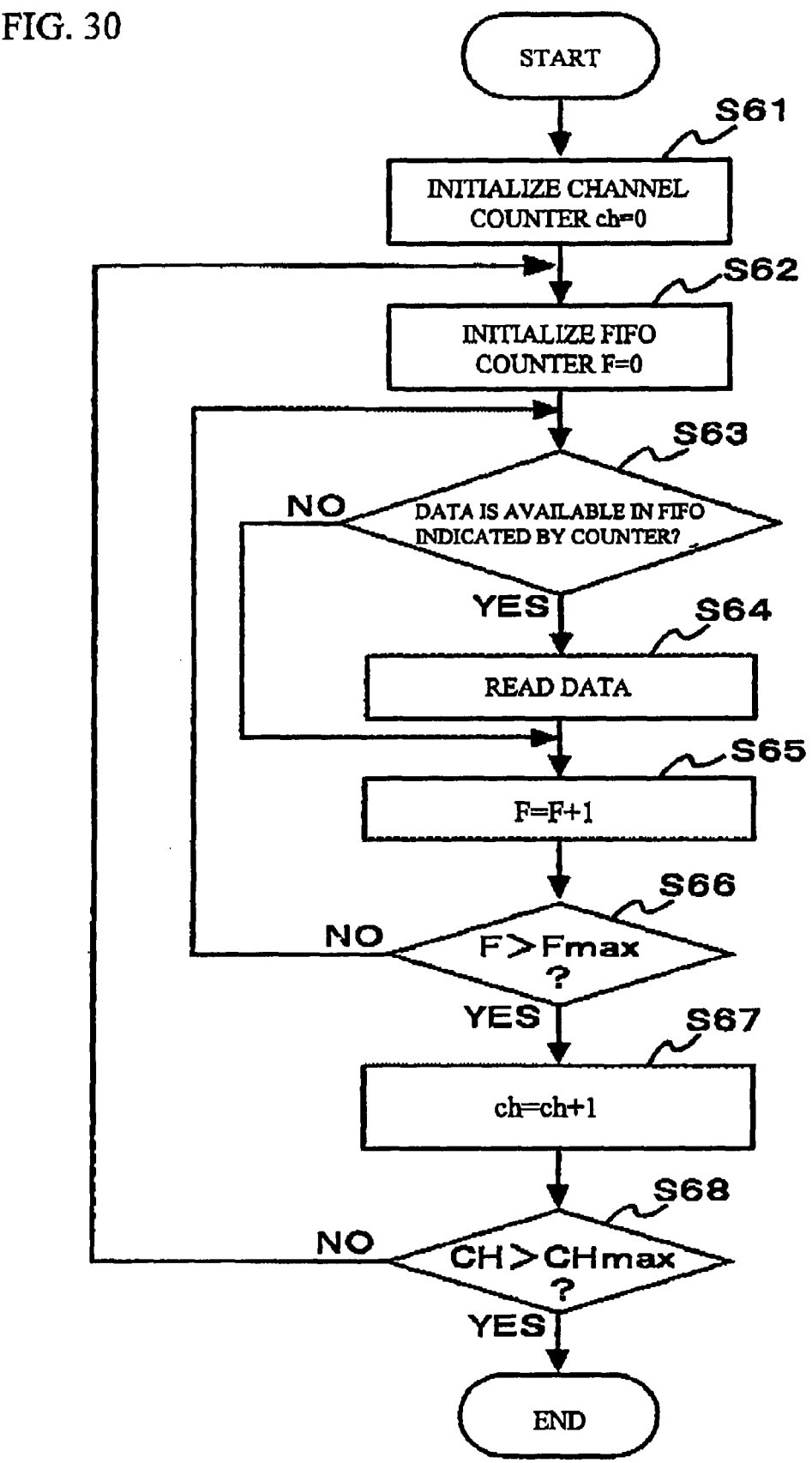
FIG. 30 is a flowchart of a processing sequence of a CPU executed when data are read from the sending FIFOs.
Figure 31:
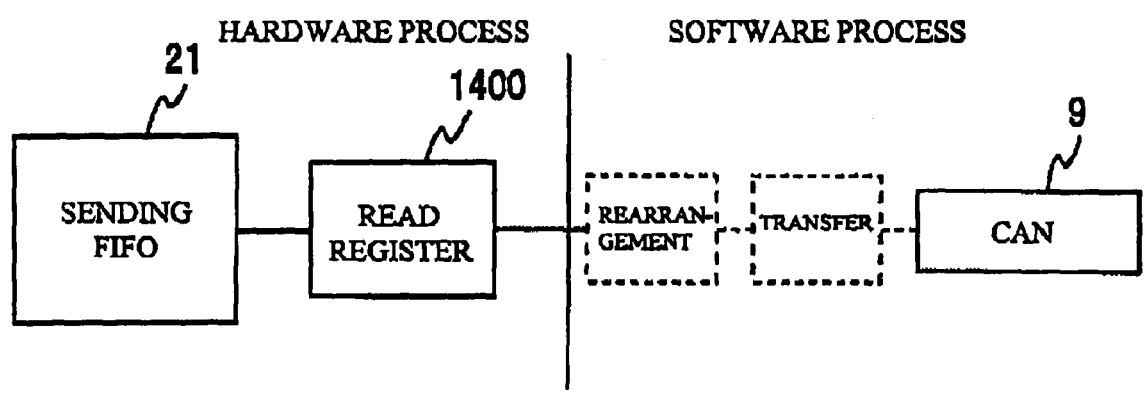
FIG. 31 illustrates a conventional sequence of reading data from a sending FIFO and transferring it to a CAN.

The CPU 2 executes a process shown in FIG. 30. First, the CPU 2 initializes a counter CH for serially identifying the channel number (step S61), and initializes an FIFO counter F for serially identifying the sending FIFO number (step S62). Next, the CPU 2 writes identification information of the sending FIFO 21 indicated by the FIFO counter F into the select register 1200. The selector 1300 makes a connection between the sending FIFO 21 specified by the information in the select register 1200 and the read register 1400. Then, the CPU 2 determines whether any data is stored in the selected sending FIFO (chO, FIFO_0) 21 (step S63). When frame data is stored in the selected sending FIFO 21 (step S63; YES), the frame data is read therefrom (step S64). Then, the CPU 2 increments the FIFO counter F by 1 (step S65), and determines whether the value of the FIFO counter F exceeds an upper limit Fmax (step 566). When the value of the FIFO counter F is equal to the upper limit Fmax or smaller (step S66: NO), the CPU 2 returns to step S63, and read frame data from the involved sending FIFO 21 (step S64). In contrast, when the value of the FIFO counter F is greater than the upper limit (max (Step S66; YES), the CPU 2 increments the channel counter CH by 1 (step S67), and determines whether the value of the channel counter CH exceeds an upper limit CHmax (step S68). When the value of the channel counter CH is equal to the upper limit CHmax or smaller (step S68: NO), the CPU 2 returns to step S62, and clears the FIFO counter P. In contrast, when the value of the channel counter CH is greater than the upper limit CHmax (step S68; YES), the CPU 2 ends the sequence because frame data have been read from all the sending FIFOs 21.

The sending FIFOs 21 can be sequentially selected one by one by the CPU 2, and frame data can be continuously read from the selected sending FIFO 21 until this becomes empty. The hardware scale of the configuration shown in FIG. 29 is much reduced, whereas the software process is slightly increased because the CPU 2 controls the select register 1200. When data is read from the read register 1400, the CPU 2 does not have increased load.

When frame data is read from the selected sending FIFO 21 and is written into the read register 1400, data items included in the frame data should be rearranged so as to match the specification of the CAN 9. This rearranging process is implemented by software. However, this burdens software. This problem is series because the CANs 9 have the respective rearrangement orders.

Figure 32:
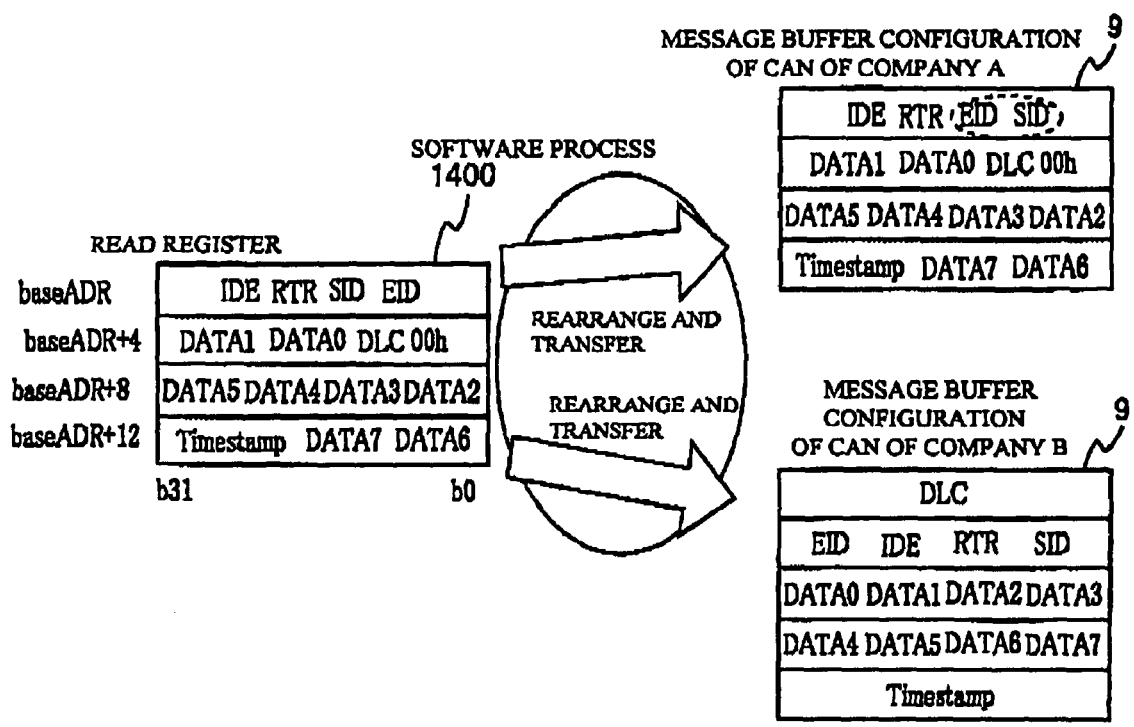
FIG. 32 illustrates a rearrangement process for rearranging data read from a sending FIFO.

FIG. 32 shows items of frame data stared in the read register 1400, and items of frame data written in CANs 9 after rearrangement. The order of items of frame data in the read register 1400 is different from that in the CANs 9. In addition, the CANs 9 have the respective orders.

Figure 33:
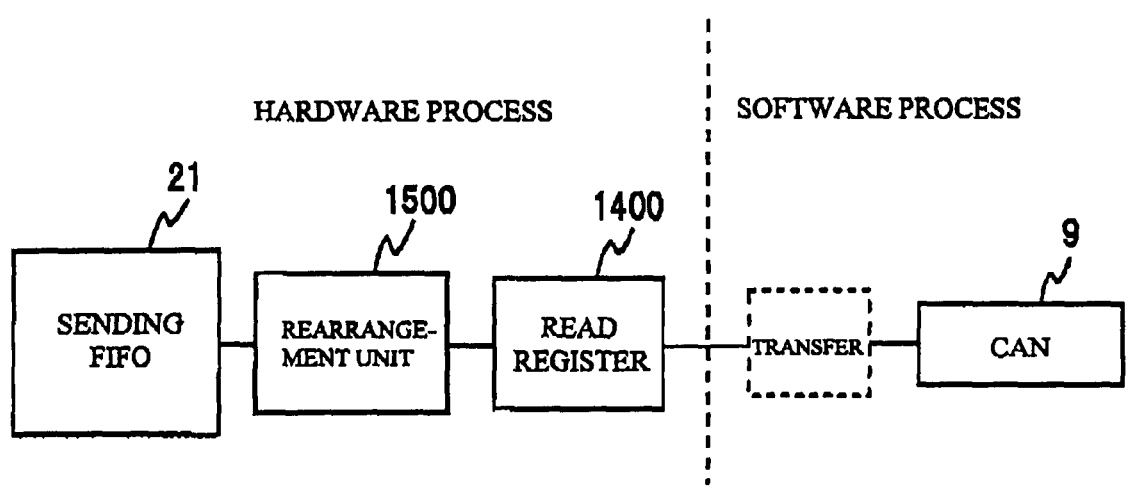
FIG. 33 illustrates the position of a rearrangement unit in the hardware configuration.

Taking the above into account, the rearrangement previously implemented by software is implemented by hardware. As shown in FIG. 33, a rearrangement unit 1500 rearranges the order of items of data in the frame data read from the sending FIFO 21, and sends rearranged items of data to the read register 1400.

Figure 34:
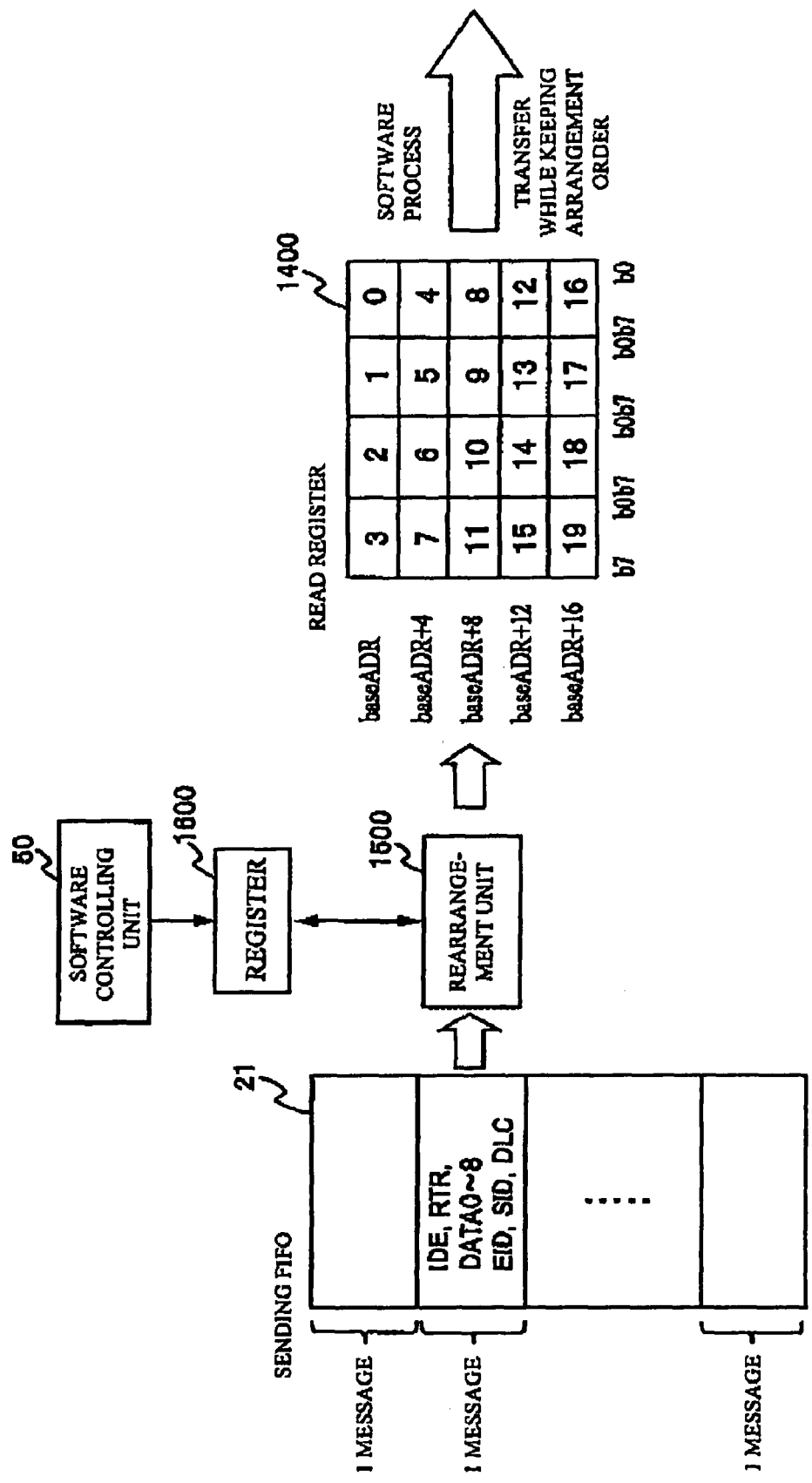
FIG. 34 illustrates a rearrangement process by the rearrangement unit.
Figure 35:
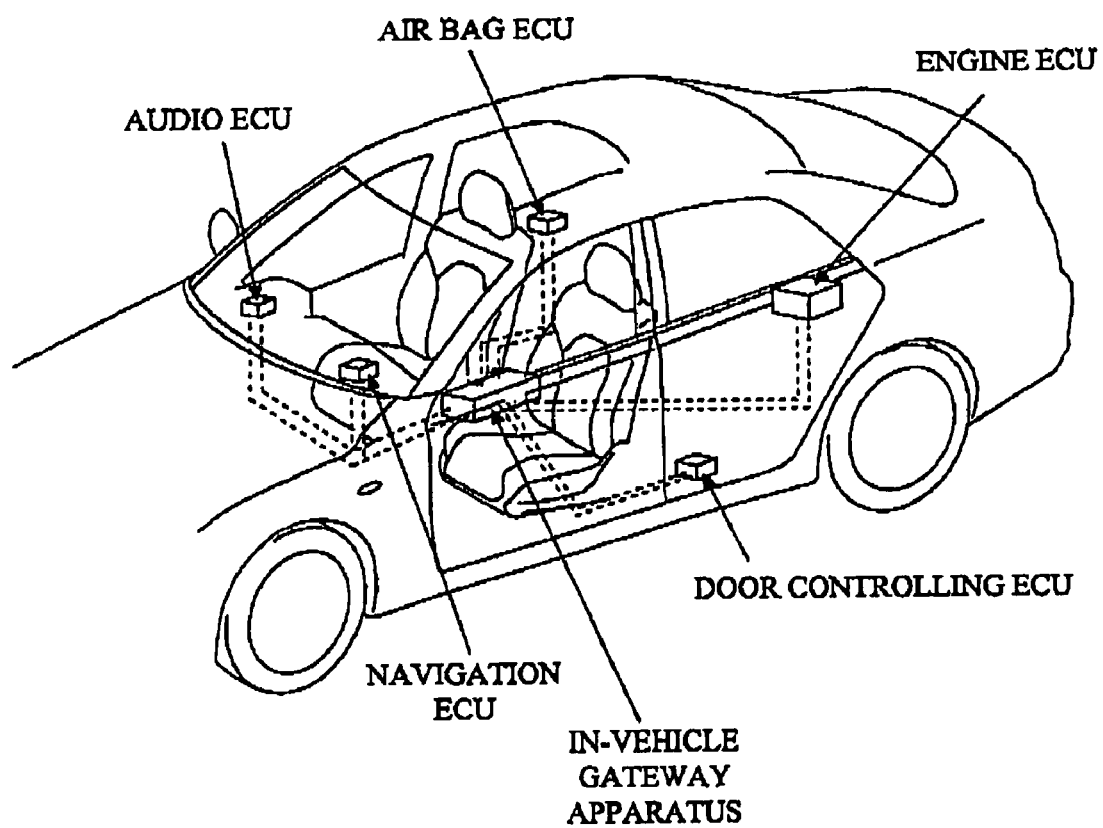
FIG. 35 illustrates the connecting configuration of a plurality of ECUs and an in-vehicle gateway apparatus.

FIG. 34 shows a sequence of rearranging items of data in the frame data by the rearrangement unit 1500. A register 1600 stores information indicating a region in the read register 1400 into which each data in the frame data should be written. The information in the register 1600 is given to each CAN 9. The rearrangement unit 1500 reads data in the frame data from the sending FIFO 21, and writes the data into the given area in the read register 1400 in accordance with the information stored in the register 1600. The hardware implementation reduces the load on software and improves the safety of the in-vehicle gateway apparatus. In addition, flexible hardware implementation can be realized because the hardware implementation can be designed to match the respective data arrangement orders of the CANs 9.

The aforementioned examples are examples of preferred embodiments of the present invention. However, it should be appreciated that the examples are non-limiting and that various modifications may be implemented without deviating from the spirit and the scope of the present invention. For example, the present invention is useful for an in-vehicle gateway apparatus, but not limited thereto.

What is claimed is:

1. A gateway apparatus to which more than three communication channels are connected, and that performs a transfer control of frame data among the more than three communication channels, each communication channel being equipped with a different communication bus respectively, the gateway apparatus comprising:
 a storing portion that stores a routing map having ID information about the frame data, transfer-destination communication channel information representing a transfer destination communication channel indicated by the ID information, and receive-allowed communication channel information representing a communication channel allowed to use the ID information, the routing map being commonly used by more than three communication channels; and
 a selecting portion that inputs the frame data transmitted from the more than three communication channels, adds receive communication channel information to the frame data, and outputs the frame data to a search engine unit, the search engine unit being provided for more than three communication channels,
 wherein the search engine unit routes the frame data to a transfer destination communication channel based on the ID information about the received frame data and the transfer-destination communication channel information being recorded in the routing map, the transfer-destination communication channel being recorded in the routing map as the transfer-destination communication channel corresponding to the ID information about the received frame data,
wherein the search engine unit does not transfer the frame data to a communication bus that is a transfer destination communication channel when the ID information about the received frame data is ID information that is not used in a communication bus which receives the frame data based on the received-allowed communication channel information, and
wherein the search engine unit determines a communication bus which receives the frame data, based on a communication channel from which the frame data is received.

2. The gateway apparatus as claimed in claim 1, further comprising a memory that stores predetermined information about routing,
wherein the search engine unit determines whether the frame data received through the communication channel that is also involved in the transfer destination should be discarded in accordance with the predetermined information stored in the memory.

3. The gateway apparatus as claimed in claim 1, further comprising:
a first part that has memory areas for respective communication channels and stores the frame data routed by the search engine unit;
a second part that temporarily stores frame data read from the first part;
a select unit that selects one of the more than three communication channels through which the frame data is transferred; and
a read unit that reads the frame data from one of the memory areas of the first part associated with the one of the more than three communication channels selected by the select unit and supplies the frame data to the second part.

4. The gateway apparatus as claimed in claim 3, wherein the select unit selects another one of the more than three communication channels after the frame data is completely read from the first part through the one of the more than three communication channels.

5. The gateway apparatus as claimed in claim 1, wherein the received frame data conforms to a protocol of CAN (Controller Area Network).

6. The gateway apparatus as claimed in claim 5, wherein information for identifying the one of the more than three communication channels through which the frame data is received by the search engine unit is added to the frame data after the frame data is received.

7. A method for performing transfer control of frame data performed by a gateway apparatus to which more than three communication channels are connected, and that performs a transfer control of frame data among the more than three communication channels, each communication channel being equipped with a different communication bus respectively, comprising:
inputting the frame data transmitted from the more than three communication channels and adding receive communication channel information to the frame data;
referring a routing map having ID information about the frame data, transfer-destination communication channel information representing a transfer destination communication channel indicated by the ID information, and receive-allowed communication channel information representing a communication channel allowed to use the ID information, the routing map being commonly used by more than three communication channels;
determining whether ID information about received frame data is ID information that is not used in a communication bus which receives the frame data based on the receive-allowed communication channel information;
discarding the frame data to the communication bus that is the transfer destination communication channel;
comparing the ID information about the received frame data with the transfer-destination communication channel information; and
routing the frame data to the transfer-destination communication channel being recorded in the routing map as the transfer-destination channel corresponding to the ID information about the received frame data,
wherein the communication bus which receives the frame data is determined based on the communication channel from which the frame data is received.

8. The gateway apparatus as claimed in claim 1, further comprising:
a second storing portion that has storing regions respectively corresponding to the more than three communication channels and that stores the frame data sent from the search engine unit to corresponding storing region of the storing regions;
a third storing portion that has storing regions respectively corresponding to the more than three communication channels and that stores the frame data retrieves from the second storing portion to corresponding storing region of the storing regions;
a rearrangement unit that retrieves the frame data from a storing region of second storing portion, that arranges items in the frame data to match the specification of sending portions, the sending portions being provided for each of the more than three communication channels, and that stores the frame data to a storing region of the third storing portion corresponding to the storing region of second storing portion;
a transmission portion that retrieves the frame data from a storing region of the third storing portion and that transmits the frame data to corresponding sending portion of the sending portions; and
the sending portions, provided for each of the more than three communication channels, that sends the frame data to the destination node transmitted from the transmission portion.

* * * * *